United States Patent
Yoo et al.

(10) Patent No.: US 12,486,282 B2
(45) Date of Patent: Dec. 2, 2025

(54) METHOD FOR SYNTHESIZING 2-((6-(HYDROXY METHYL)CHROMENE-5-YL)OXY)-1-PHENYLETHANONE DERIVATIVE

(71) Applicant: GLACEUM INC., Suwon-si (KR)

(72) Inventors: Sang Ku Yoo, Suwon-si (KR); Ji Young Kim, Seoul (KR); Jung Woo Lee, Anyang-si (KR); Jeong Ho Lim, Yongin-si (KR); Ku Suk Kang, Yongin-si (KR); Jin Young Kim, Iksan-si (KR)

(73) Assignee: GLACEUM INC., Suwon-si (KR)

( * ) Notice: Subject to any disclaimer, the term of this patent is extended or adjusted under 35 U.S.C. 154(b) by 798 days.

(21) Appl. No.: 17/630,985

(22) PCT Filed: Jul. 20, 2020

(86) PCT No.: PCT/KR2020/009549
§ 371 (c)(1),
(2) Date: Jan. 28, 2022

(87) PCT Pub. No.: WO2021/020788
PCT Pub. Date: Feb. 4, 2021

(65) Prior Publication Data
US 2022/0298170 A1    Sep. 22, 2022

(30) Foreign Application Priority Data
Jul. 30, 2019  (KR) .................. 10-2019-0092711

(51) Int. Cl.
*C07D 493/04* (2006.01)
*C07D 311/58* (2006.01)

(52) U.S. Cl.
CPC .......... *C07D 493/04* (2013.01); *C07D 311/58* (2013.01)

(58) Field of Classification Search
CPC ..................... C07D 493/04; C07D 311/58
USPC ........................................... 514/454
See application file for complete search history.

(56) References Cited

U.S. PATENT DOCUMENTS

| 4,716,238 A | * | 12/1987 | Timar | ............. | A01N 43/30 |
| | | | | | 549/408 |
| 10,669,282 B2 | | 6/2020 | Yoo et al. | | |

FOREIGN PATENT DOCUMENTS

| CA | 3039326 A1 | * | 4/2018 | .......... C07D 493/04 |
| CN | 1265651 A | | 9/2000 | |
| CN | 103030647 A | | 4/2013 | |
| CN | 108822065 A | | 11/2018 | |
| CN | 109863152 A | | 6/2019 | |
| JP | 2006-008604 A | | 1/2006 | |
| KR | 10-2007-0052211 A | | 5/2007 | |
| KR | 10-2018-0037584 A | | 4/2018 | |
| WO | 2007058480 A1 | | 5/2007 | |
| WO | 2009111428 A2 | | 9/2009 | |

OTHER PUBLICATIONS

International Search Report corresponding to PCT/KR2020/009549; dated Jun. 24, 2021 (4 pages, including English translation).
Yoo et al. "Facile and Efficient Synthesis of (+/−)-Glabridin" Bull. Korean Chem. Soc. 28(3):481-484 (2007).
Extended European Search Report corresponding to EP 20846199.6 dated Aug. 9, 2022 (6 pages).

* cited by examiner

Primary Examiner — Jeffrey H Murray
Assistant Examiner — Rilla Marie Samsell
(74) Attorney, Agent, or Firm — Myers Bigel, P.A.

(57) ABSTRACT

The present invention relates to a method for synthesizing a 2-((6-(hydroxymethyl)chromen-5-yl)oxy)-1-phenylethanone derivative. When the method is used, it is possible to effectively synthesize a 2-((6-(hydroxymethyl)chromene-5-yl)oxy)-1-phenylethanone derivative.

7 Claims, No Drawings

METHOD FOR SYNTHESIZING 2-((6-(HYDROXYMETHYL)CHROMENE-5-YL)OXY)-1-PHENYLETHANONE DERIVATIVE

CROSS REFERENCE TO RELATED APPLICATIONS

This application is a 35 U.S.C. § 371 national stage application of PCT International Application No. PCT/KR2020/009549, filed Jul. 20, 2020, which claims priority from Korean Patent Application No. 10-2019-0092711, filed Jul. 30, 2019, the contents of which are incorporated herein in their entireties by reference. The above-referenced PCT International Application was published in the Korean language as International Publication No. WO 2021/020788 A2 on Feb. 4, 2021.

TECHNICAL FIELD

This application claims the benefit of the filing date of Korean Patent Application No. 10-2019-0092711, filed with the Korean Intellectual Property Office on Jul. 30, 2019, the entire content of which is incorporated herein.

The present invention relates to a method for synthesizing 2-((6-(hydroxymethyl)chromen-5-yl)oxy)-1-phenylethanone derivatives.

BACKGROUND ART

Patent Document 1 [Korean Patent Application Publication No. 10-2015-0075030] discloses that pyranochromenylphenol derivatives are effective in preventing and treating various metabolic syndromes including hyperlipidemia, fatty liver, abnormal sugar metabolism, diabetes, and obesity. Patent Document 2 [Korean Patent Application Publication No. 10-2018-0037584] discloses a method for producing 3-phenyl-2,3,4,8,9,10-hexahydropyrano[2,3-f]chromene derivatives as key intermediates for synthesizing these pyranochromenylphenol derivatives. Specifically, as shown in Reaction Scheme A below, Patent Document 2 discloses a method of synthesizing various derivatives disclosed in Patent Document 1 by coupling a compound of Formula A-1 with a compound of Formula A-2 to obtain a compound of Formula A-3, reducing the compound of Formula A-3 to obtain a compound of Formula A-4, and cyclizing the compound of Formula A-4 to obtain a compound of Formula A-5, which is then hydrogenated. Here, in the step of producing the compound of Formula A-4 from the compound of Formula A-3, not only the reaction needs to be performed by slowly adding L-selectride® at a cryogenic temperature of −78° C., but also expensive L-selectride® needs to be used. Thus, commercial mass production of the 2-((6-(hydroxymethyl)-2H-chromen-5-yl)oxy)-1-phenylethanone derivative represented by Formula A-4 may be very laborious and difficult.

[Reaction Scheme A]

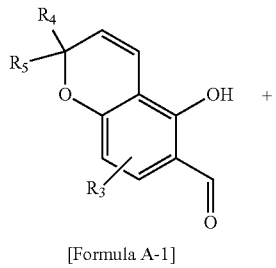

[Formula A-1]

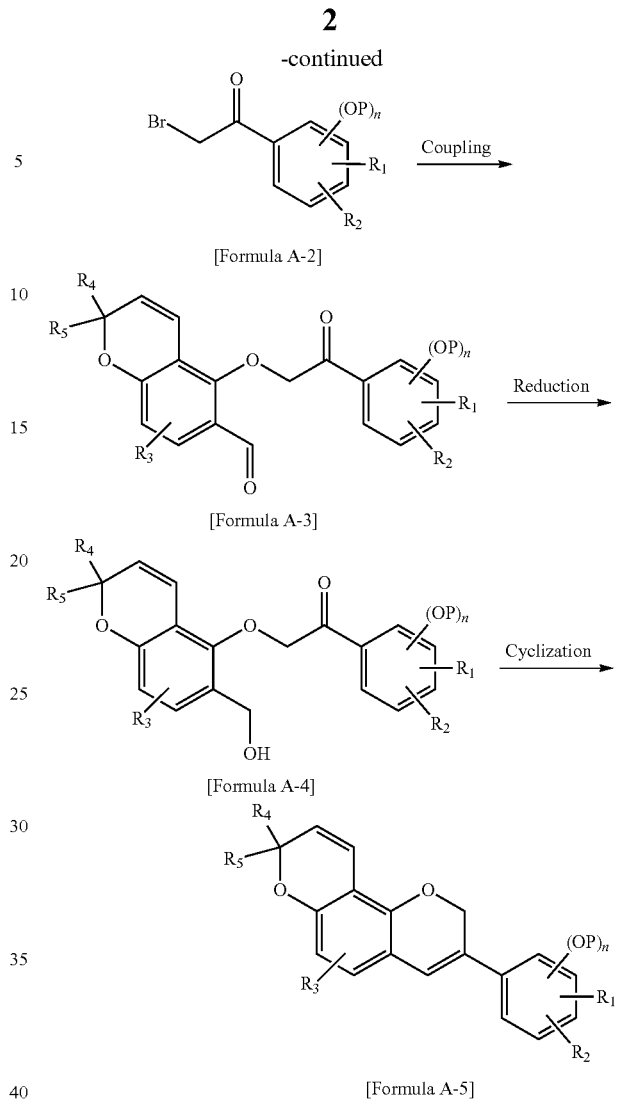

Accordingly, there is a need for a synthesis method capable of mass-producing the 2-((6-(hydroxymethyl)-2H-chromen-5-yl)oxy)-1-phenylethanone derivative represented by Formula A-4 under mild conditions.

PRIOR ART DOCUMENTS

Patent Documents

Korean Patent Application Publication No. 10-2015-0075030
Korean Patent Application Publication No. 10-2018-0037584

DISCLOSURE

Technical Problem

The technical problem to be achieved by the present invention is to provide a synthesis method capable of mass-producing 2-((6-(hydroxymethyl)chromen-5-yl)oxy)-1-phenylethanone derivatives under mild conditions.

However, the problems to be solved by the present invention are not limited to the above-mentioned problem, and other problems not mentioned herein will be clearly understood by those skilled in the art from the following description.

Technical Solution

One embodiment of the present invention provides a method for synthesizing a 2-((6-(hydroxymethyl)chromen-5-yl)oxy)-1-phenylethanone derivative represented by Formula 4, the method comprising steps of: (a) reducing a compound of Formula 1 to produce a compound of Formula 2; and (b) coupling the compound of Formula 2 with a compound of Formula 3:

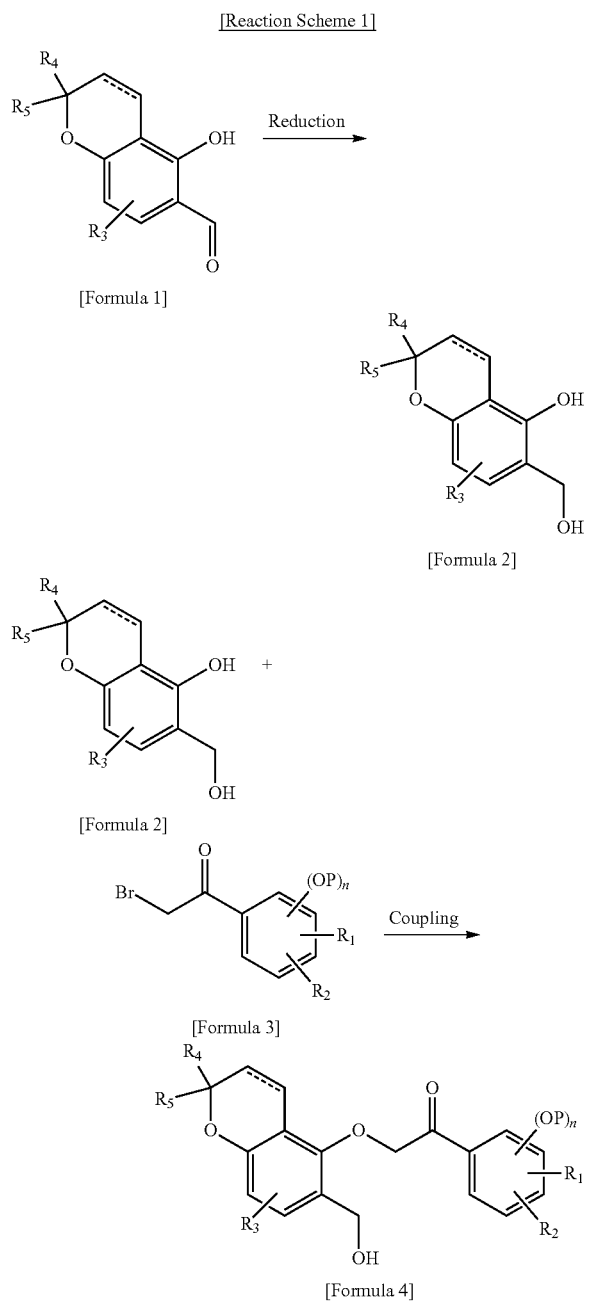

wherein the dotted line is an optional double bond;

$R_1$ and $R_2$ are each independently any one of a hydrogen atom, a substituted or unsubstituted linear or branched $C_1$-$C_6$ alkyl group, a halogen atom, a substituted or unsubstituted linear or branched $C_1$-$C_6$ alkoxy group, a substituted or unsubstituted linear or branched $C_1$-$C_4$ thioalkyl group, a substituted or unsubstituted allyloxy group, a substituted or unsubstituted aryloxy group, and a phenyl group;

$R_3$ is any one of a hydrogen atom, a $C_1$-$C_3$ alkyl group, a $C_1$-$C_3$ alkoxy group, and a halogen atom;

$R_4$ and $R_5$ are each independently any one of a hydrogen atom and a $C_1$-$C_2$ alkyl group;

P is any one of a substituted or unsubstituted linear or branched $C_1$-$C_4$ alkyl group, a substituted or unsubstituted benzyl group, an allyl group, a t-butyldimethylsilyl group, t-butyldiphenylsilyl group, a dimethylphenylsilyl group, a trimethylsilyl group, $MeSO_2$, a p-toluenesulfonyl group, and a 2,4,6-trimethylbenzenesulfonyl group;

n is an integer from 1 to 3;

when OP is plural in number, they are the same or different; and the substituent for the substituted alkyl group, substituted alkoxy group, substituted thioalkyl group, substituted allyloxy group, substituted aryloxy group or substituted benzyl group is any one of a benzyloxy group, a halogen atom, a linear or branched $C_1$-$C_5$ alkyl group, a linear or branched $C_1$-$C_5$ alkoxy group, a linear or branched $C_1$-$C_3$ thioalkyl group, a nitro group, and a naphthalene group.

Another embodiment of the present invention provides a method for synthesizing a 3-phenyl-2,3,4,8,9,10-hexahydropyrano[2,3-f]chromene derivative of Formula I, the method comprising steps of: (i) cyclizing the compound of Formula 4, produced according to one embodiment of the present invention, to produce a compound of Formula 5; and (ii) reducing the compound of Formula 5:

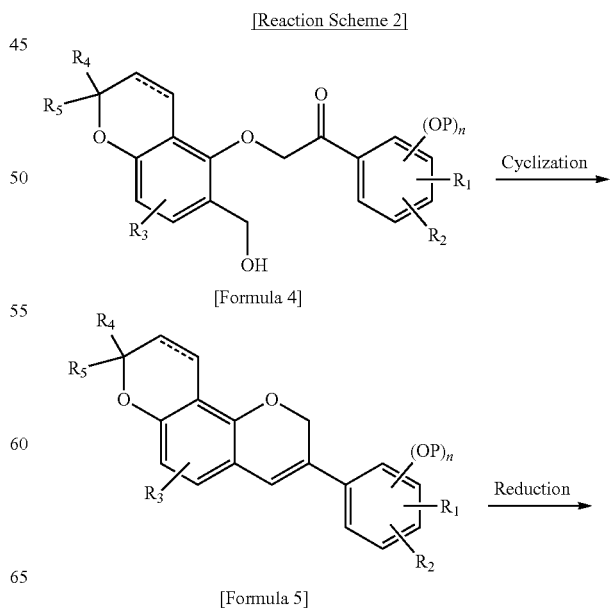

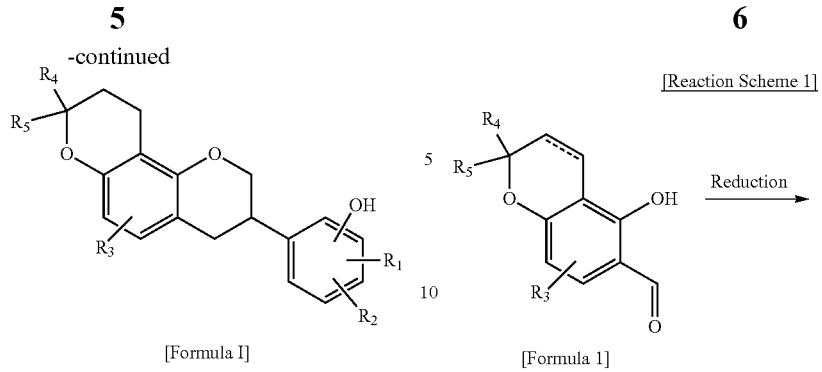

[Formula I]

wherein the dotted line is an optional double bond, and $R_1$ to $R_5$, P and n are the same as defined in Formulas 1 to 4 above.

Still another embodiment of the present invention provides a 6-(hydroxymethyl)chromen-5-ol derivative represented by the following Formula 2 or a solvate thereof:

[Formula 2]

wherein $R_3$ is any one of a hydrogen atom, a $C_1$-$C_3$ alkyl group, a $C_1$-$C_3$ alkoxy group, and a halogen atom; and $R_4$ and $R_5$ are each independently any one of a hydrogen atom and a $C_1$-$C_2$ alkyl group.

Advantageous Effects

The production method according to one embodiment of the present invention may commercially produce 2-((6-(hydroxymethyl)chromen-5-yl)oxy)-1-phenylethanone derivatives in a simple and easy manner.

In addition, the production method according to one embodiment of the present invention may economically produce 2-((6-(hydroxymethyl)chromen-5-yl)oxy)-1-phenylethanone derivatives.

BEST MODE

One embodiment of the present invention provides a method for synthesizing a 2-((6-(hydroxymethyl)chromen-5-yl)oxy)-1-phenylethanone derivative represented by Formula 4, the method comprising steps of: (a) reducing a compound of Formula 1 to produce a compound of Formula 2; and (b) coupling the compound of Formula 2 with a compound of Formula 3:

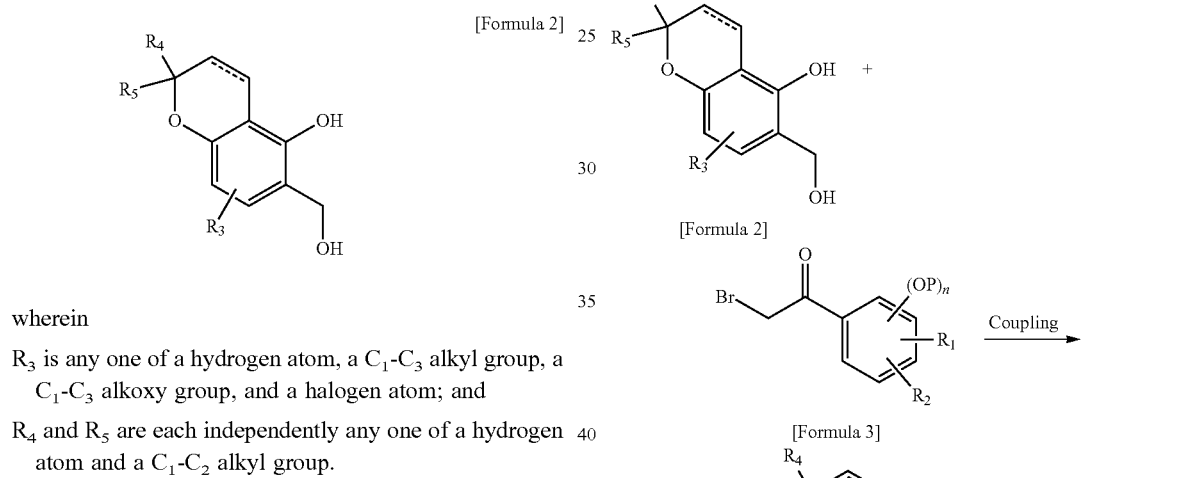

[Reaction Scheme 1]

wherein the dotted line is an optional double bond;

$R_1$ and $R_2$ are each independently any one of a hydrogen atom, a substituted or unsubstituted linear or branched $C_1$-$C_6$ alkyl group, a halogen atom, a substituted or unsubstituted linear or branched $C_1$-$C_6$ alkoxy group, a substituted or unsubstituted linear or branched $C_1$-$C_4$ thioalkyl group, a substituted or unsubstituted allyloxy group, a substituted or unsubstituted aryloxy group, and a phenyl group;

$R_3$ is any one of a hydrogen atom, a $C_1$-$C_3$ alkyl group, a $C_1$-$C_3$ alkoxy group, and a halogen atom;

$R_4$ and $R_5$ are each independently any one of a hydrogen atom and a $C_1$-$C_2$ alkyl group;

P is any one of a substituted or unsubstituted linear or branched $C_1$-$C_4$ alkyl group, a substituted or unsubstituted benzyl group, an allyl group, a t-butyldimethylsilyl group, t-butyldiphenylsilyl group, a dimethylphenylsilyl group, a trimethylsilyl group, MeSO₂, a p-toluenesulfonyl group, and a 2,4,6-trimethylbenzenesulfonyl group;

n is an integer ranging from 1 to 3;

when OP is plural in number, they are the same or different; and the substituent for the substituted alkyl group, substituted alkoxy group, substituted thioalkyl group, substituted allyloxy group, substituted aryloxy group or substituted benzyl group is any one of a benzyloxy group, a halogen atom, a linear or branched $C_1$-$C_5$ alkyl group, a linear or branched $C_1$-$C_5$ alkoxy group, a linear or branched $C_1$-$C_3$ thioalkyl group, a nitro group, and a naphthalene group.

When the compound of Formula A-4 (the compound of Formula 4 of the present invention) is synthesized as shown in Reaction Scheme A of Patent Document 2 [Korean Patent Application Publication No. 10-2018-0037584], not only the reaction should be carried out at a cryogenic temperature, but also expensive L-selectride® should be used, and hence commercial mass production of the compound of Formula A-4 may be difficult. However, when the compound of Formula 4 is synthesized according to one embodiment of the present invention, the synthesis is achieved by reducing the compound of Formula 1 to produce the compound of Formula 2, and then coupling the compound of Formula 2 with the compound of Formula 3, and thus there is no need to carry out the reduction reaction at a cryogenic temperature and there is no need to use an expensive reducing agent. Accordingly, it is possible to commercially produce the 2-((6-(hydroxymethyl)chromen-5-yl)oxy)-1-phenylethanone derivative in a simple and easy manner.

Examples of the 2-((6-(hydroxymethyl)chromen-5-yl)oxy)-1-phenylethanone derivative represented by Formula 4 include the following compounds.

[Compound 4-1]

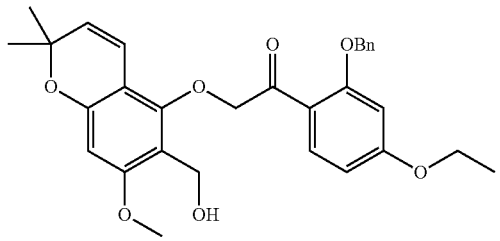

[Compound 4-2]

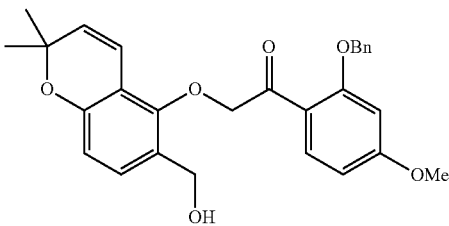

-continued

[Compound 4-3]

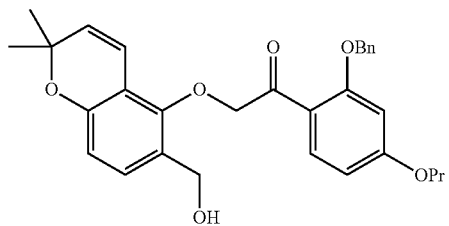

[Compound 4-4]

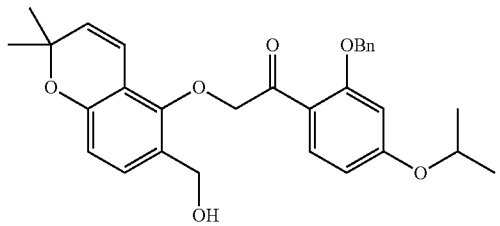

[Compound 4-5]

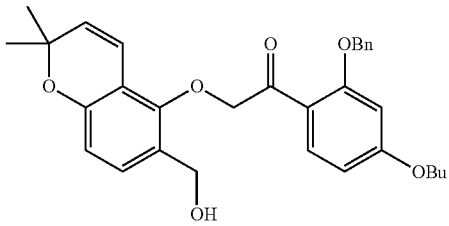

[Compound 4-6]

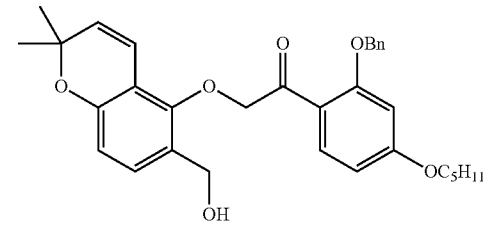

[Compound 4-7]

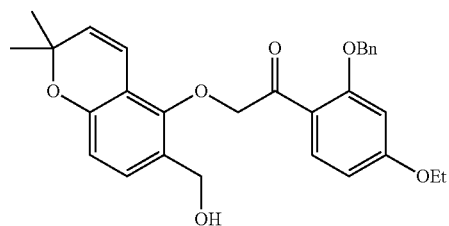

[Compound 4-8]

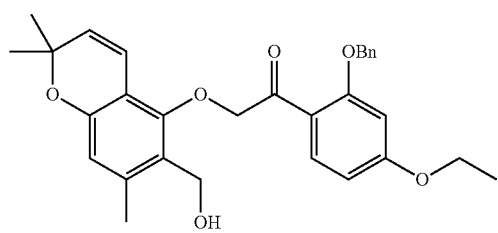

[Compound 4-9]
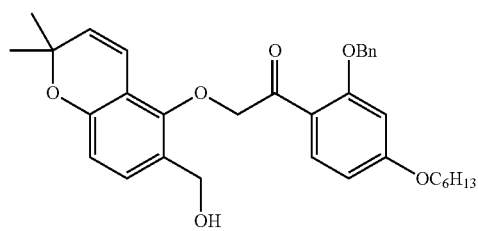
[Compound 4-10]
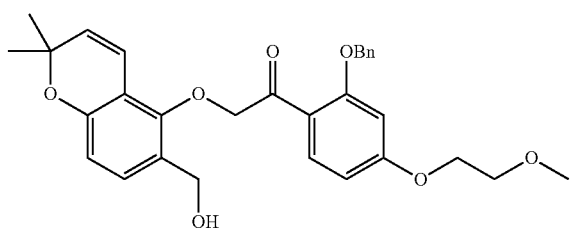
[Compound 4-11]
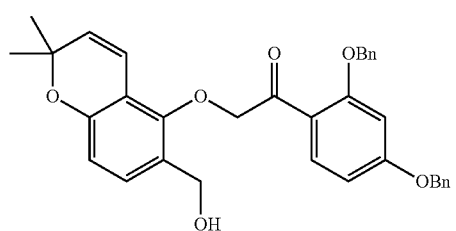
[Compound 4-12]
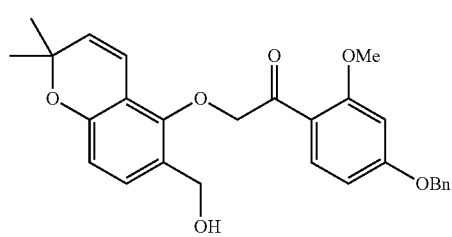
[Compound 4-13]
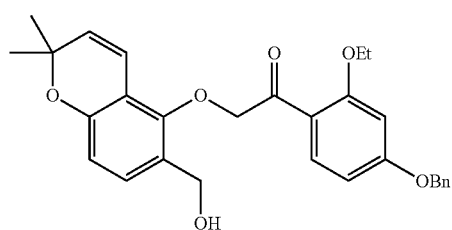
[Compound 4-14]
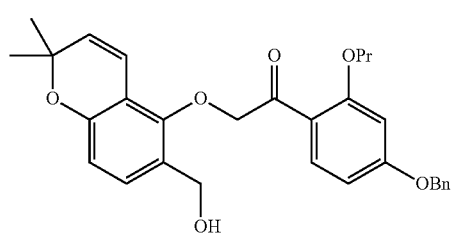
[Compound 4-15]
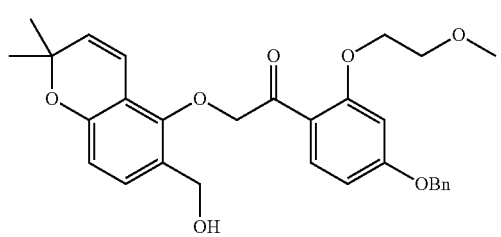
[Compound 4-16]
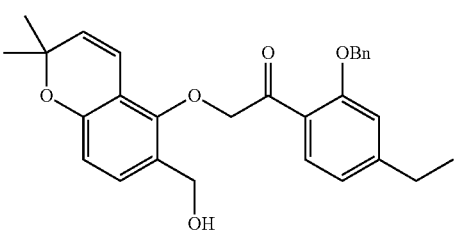
[Compound 4-17]
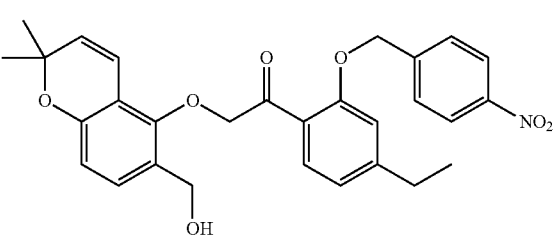
[Compound 4-18]
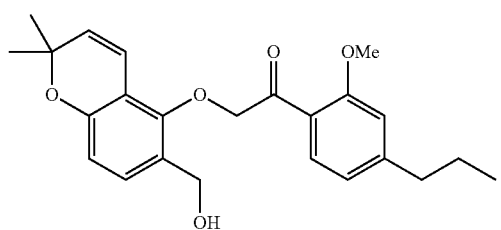
[Compound 4-19]
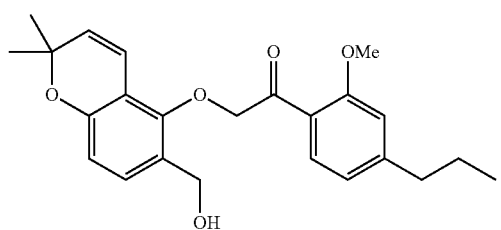
[Compound 4-20]
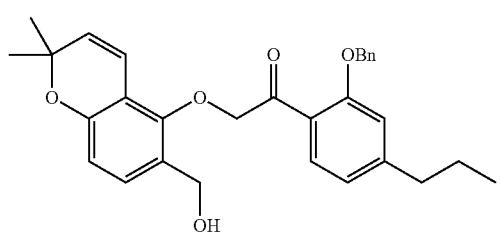

[Compound 4-21]
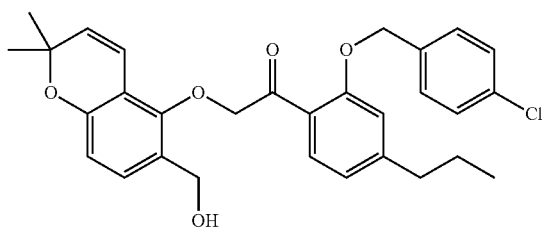
[Compound 4-22]
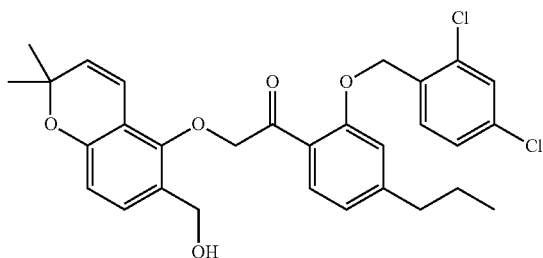
[Compound 4-23]
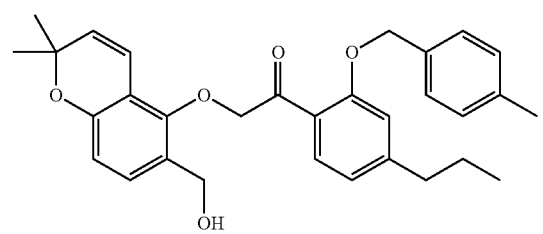
[Compound 4-24]
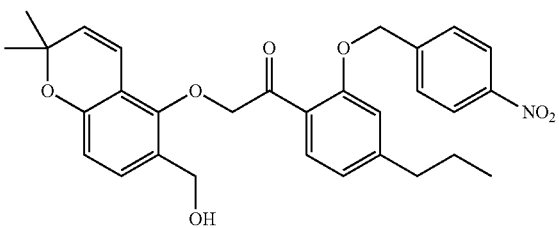
[Compound 4-25]
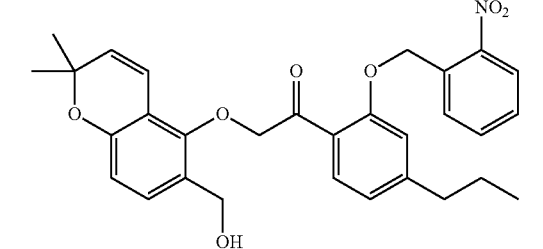
[Compound 4-26]
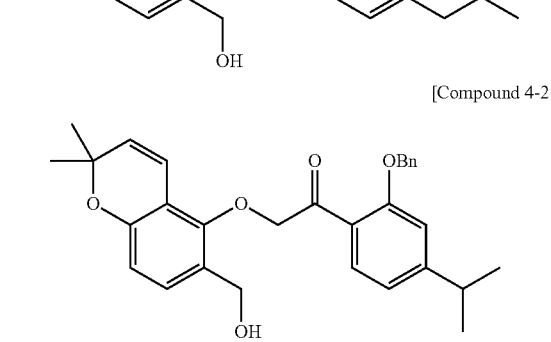
[Compound 4-27]
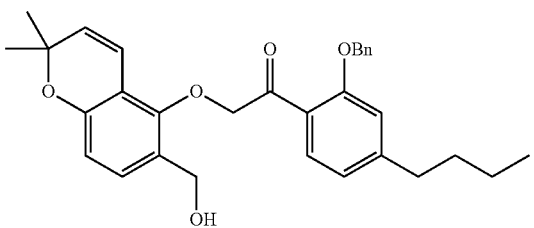
[Compound 4-28]
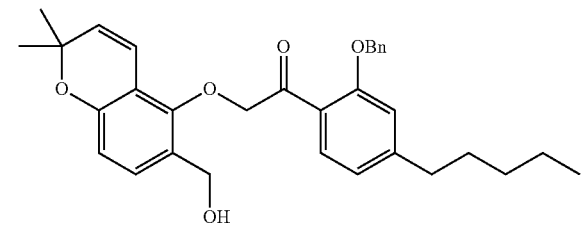
[Compound 4-29]
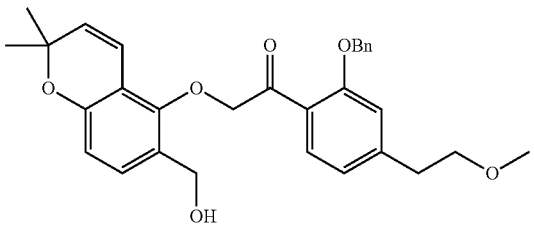
[Compound 4-30]
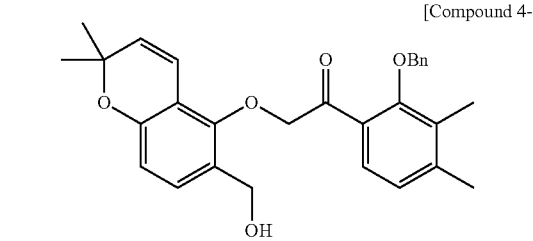
[Compound 4-31]
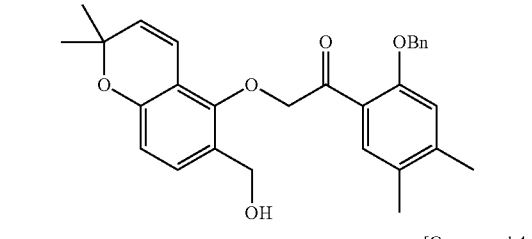
[Compound 4-32]
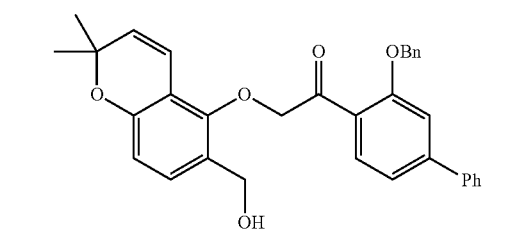

[Compound 4-33]
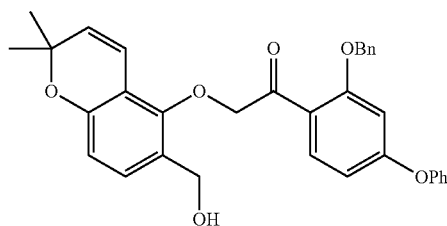
[Compound 4-34]
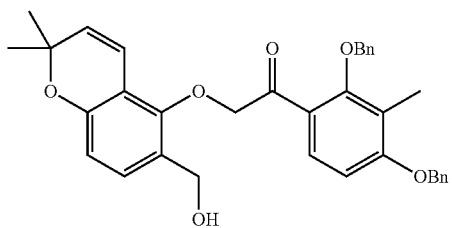
[Compound 4-35]
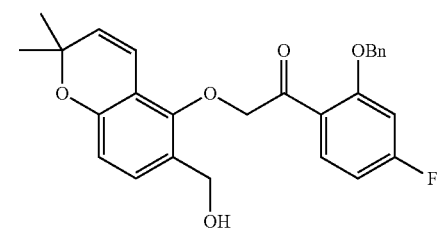
[Compound 4-36]
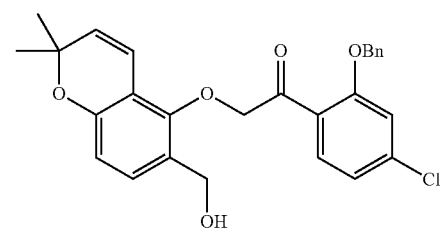
[Compound 4-37]
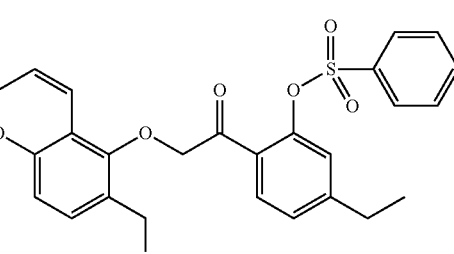
[Compound 4-38]
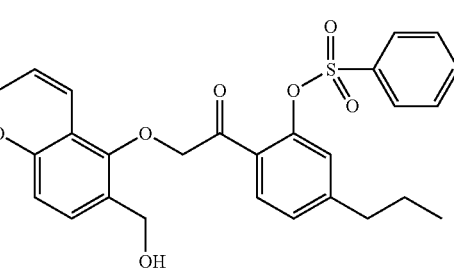
[Compound 4-39]
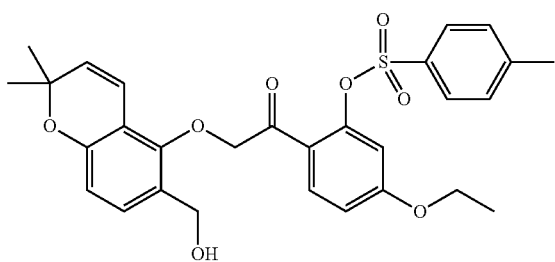
[Compound 4-40]
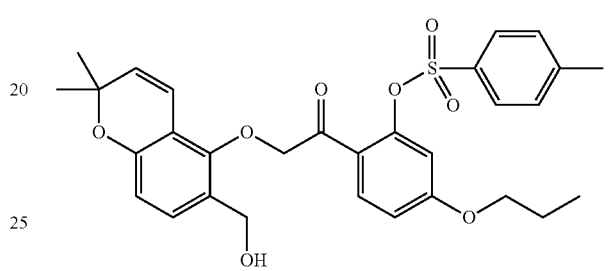
[Compound 4-41]
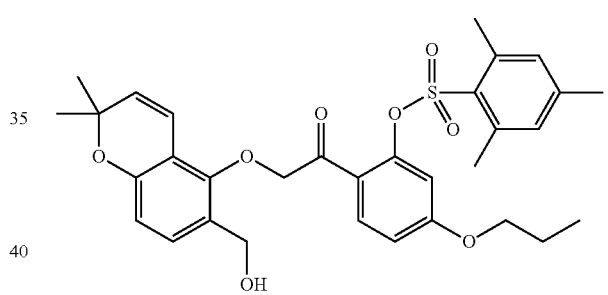
[Compound 4-42]
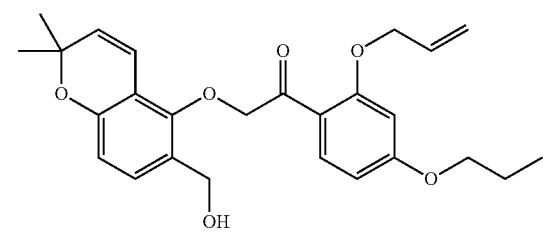
[Compound 4-43]
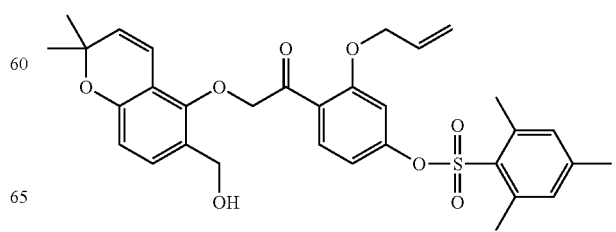

[Compound 4-44]
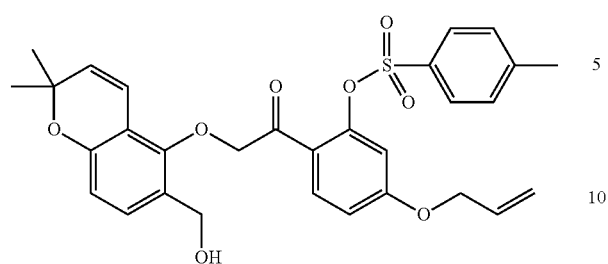
[Compound 4-45]
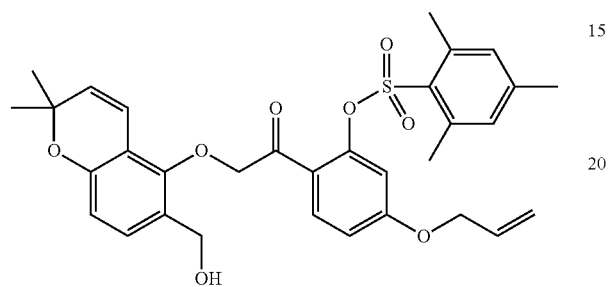
[Compound 4-46]
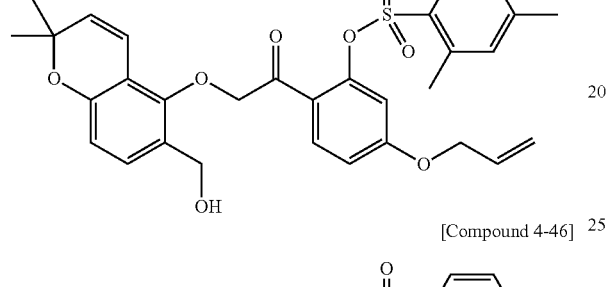
[Compound 4-47]
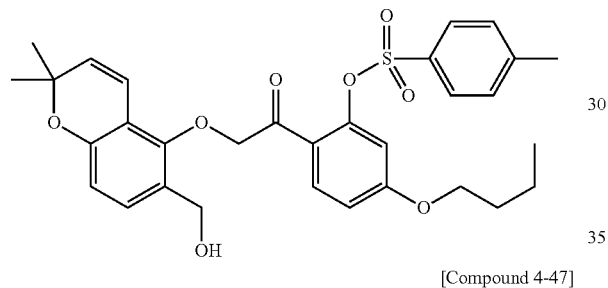
[Compound 4-48]
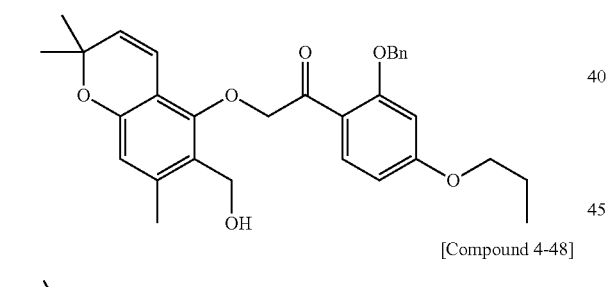
[Compound 4-49]
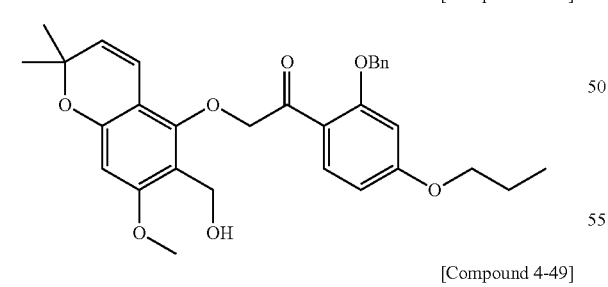
[Compound 4-50]
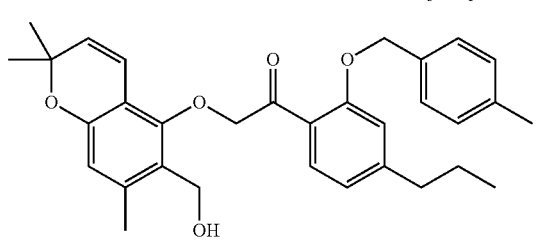
[Compound 4-51]
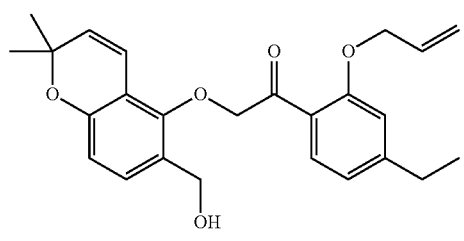
[Compound 4-52]
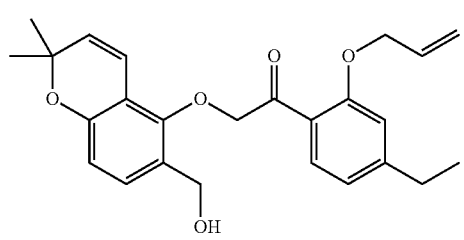
[Compound 4-53]
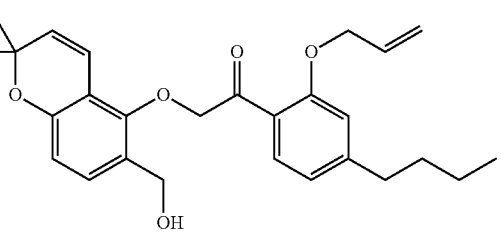
[Compound 4-54]
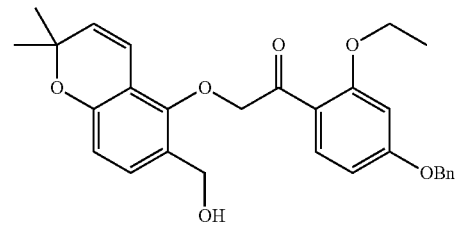
[Compound 4-55]
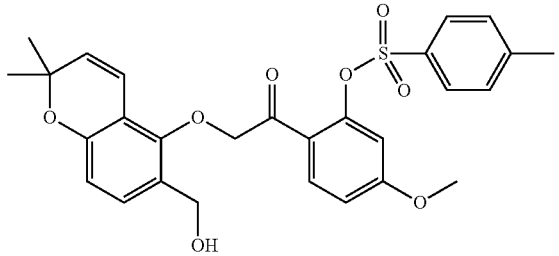

[Compound 4-56]
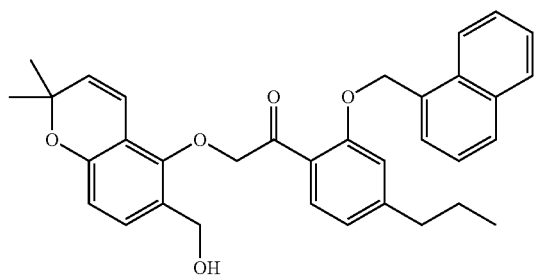
[Compound 4-57]
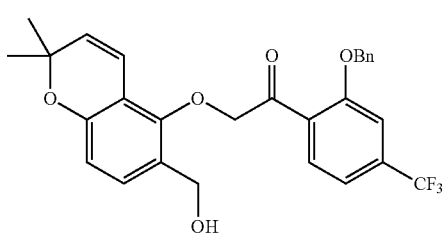
[Compound 4-58]
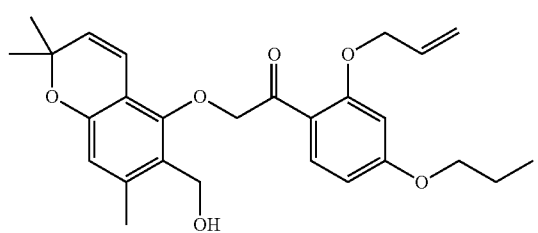
[Compound 4-59]
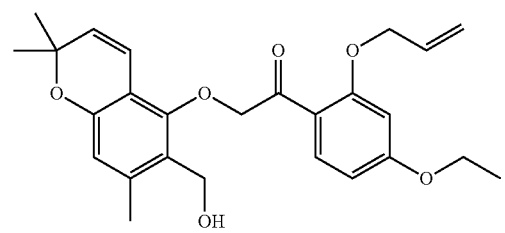
[Compound 4-60]
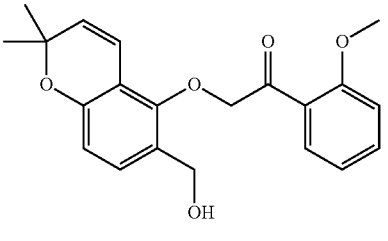
[Compound 4-61]
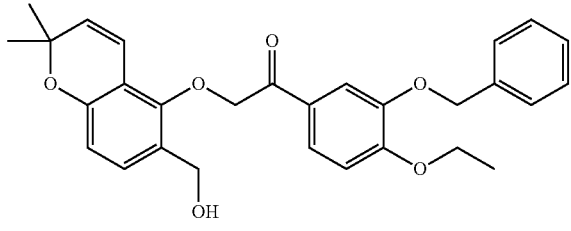
[Compound 4-62]
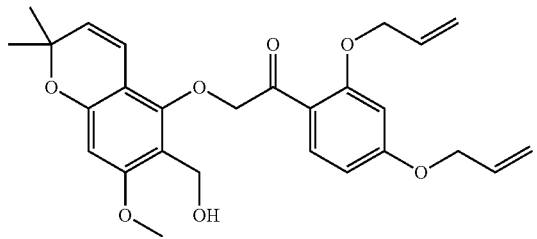
[Compound 4-63]
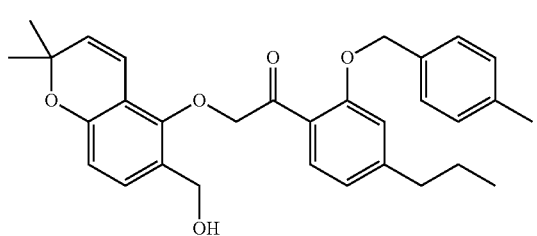
[Compound 4-64]
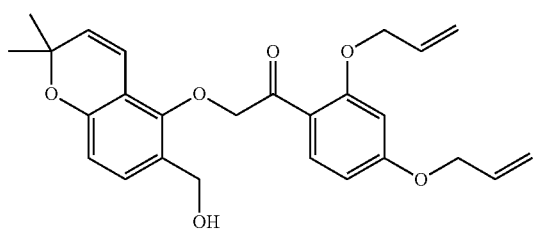
[Compound 4-65]
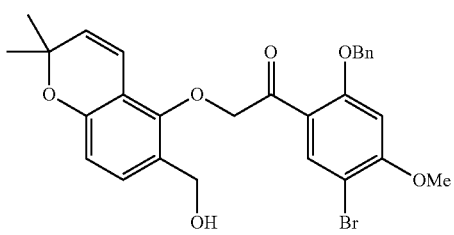
[Compound 4-66]
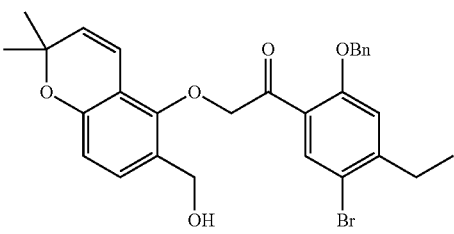
[Compound 4-67]
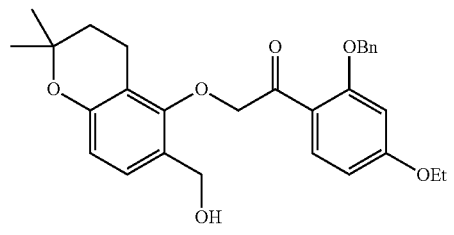

[Compound 4-68]
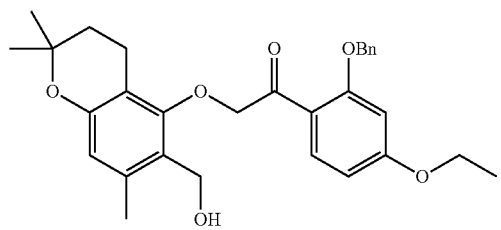
[Compound 4-69]
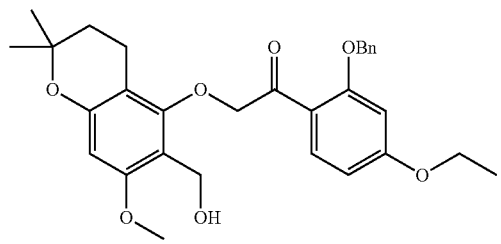
[Compound 4-70]
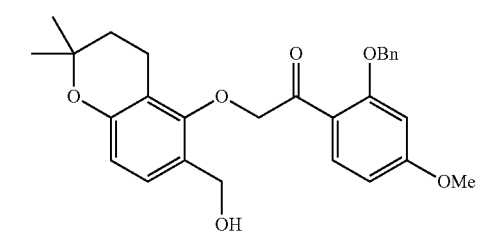
[Compound 4-71]
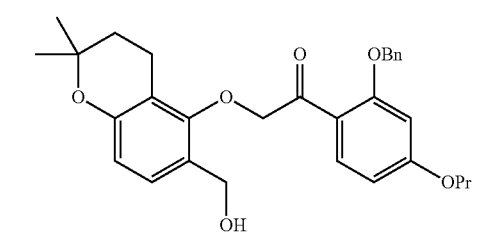
[Compound 4-72]
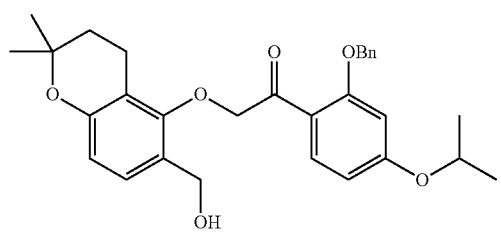
[Compound 4-73]
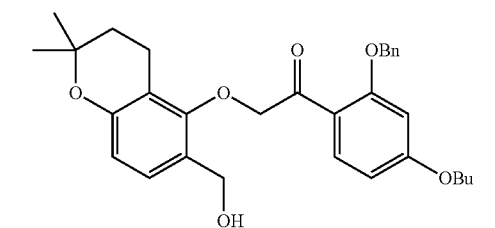
[Compound 4-74]
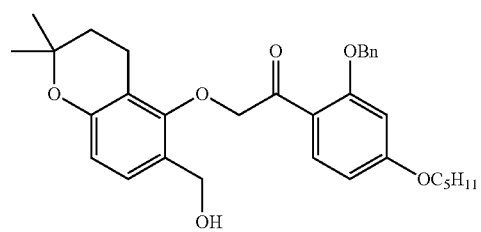
[Compound 4-75]
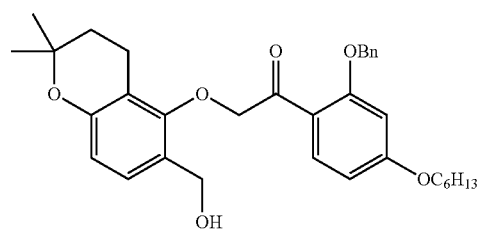
[Compound 4-76]
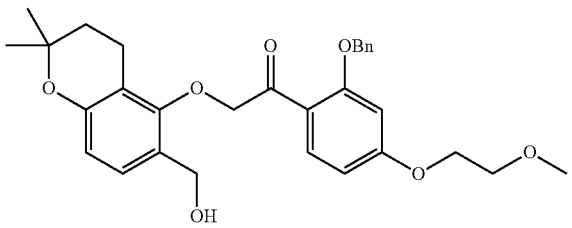
[Compound 4-77]
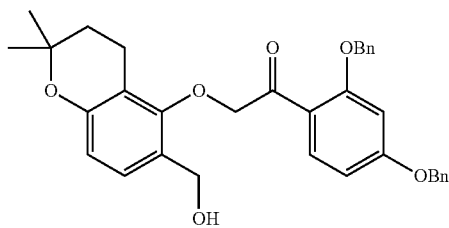
[Compound 4-78]
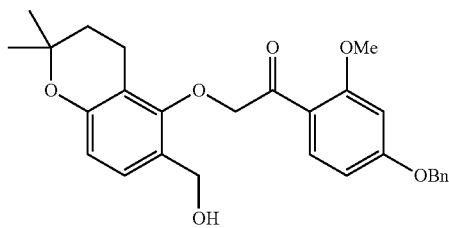
[Compound 4-79]
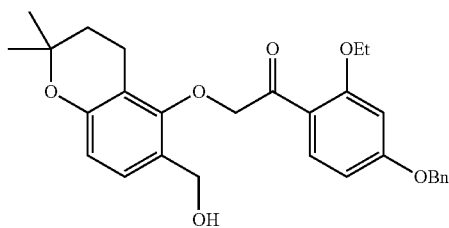

[Compound 4-80]
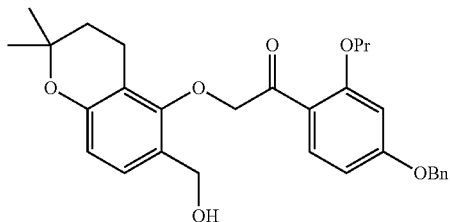
[Compound 4-81]
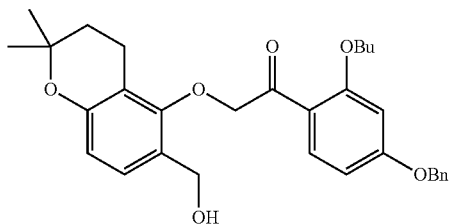
[Compound 4-82]
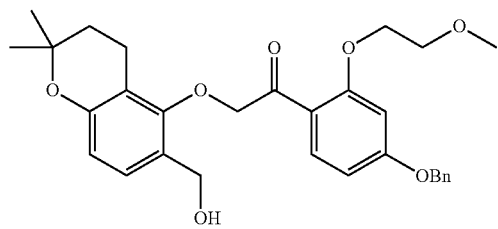
[Compound 4-83]
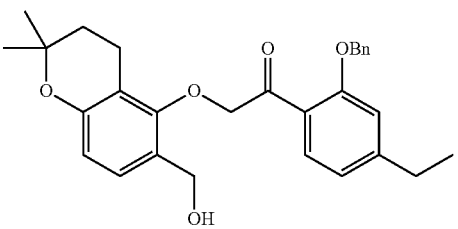
[Compound 4-84]
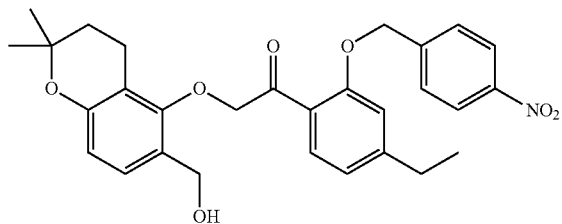
[Compound 4-85]
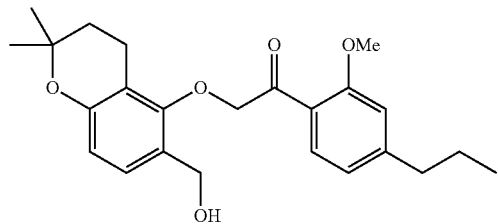
[Compound 4-86]
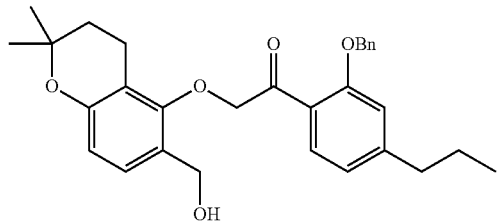
[Compound 4-87]
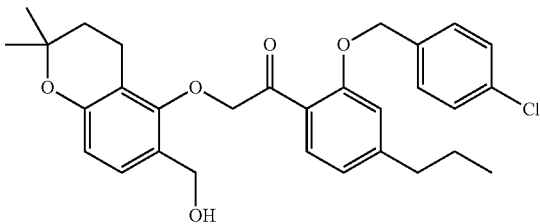
[Compound 4-88]
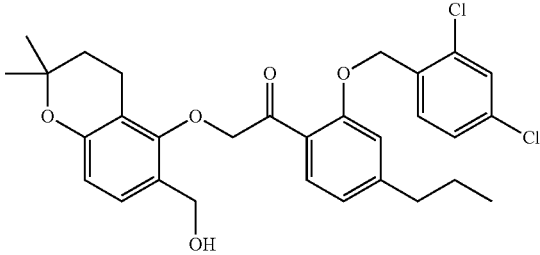
[Compound 4-89]
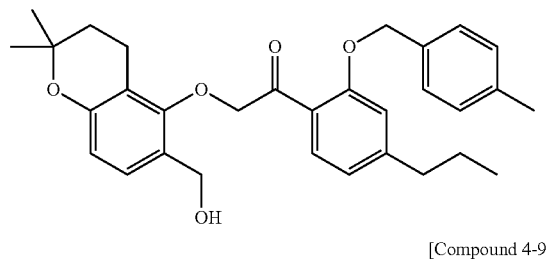
[Compound 4-90]
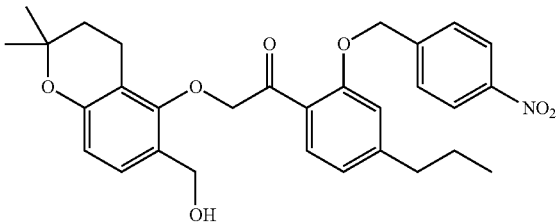
[Compound 4-91]

[Compound 4-92]
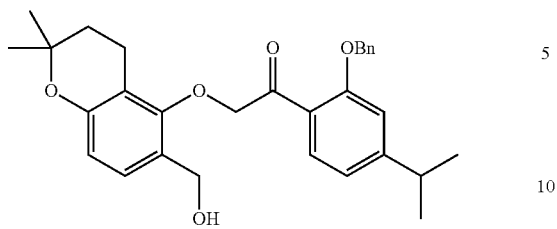
[Compound 4-93]
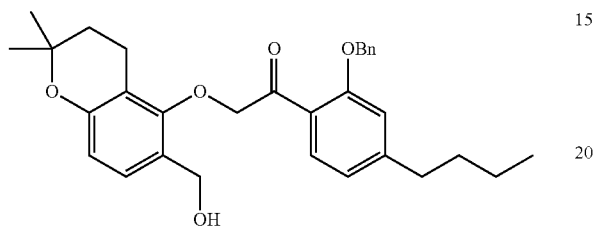
[Compound 4-94]
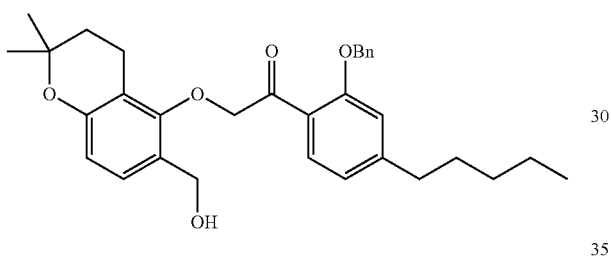
[Compound 4-95]
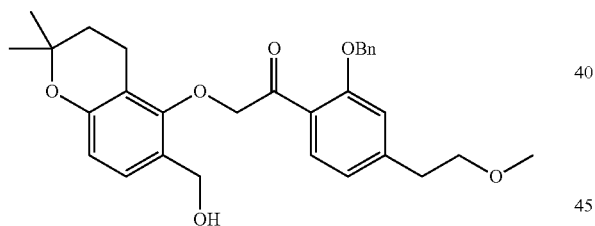
[Compound 4-96]
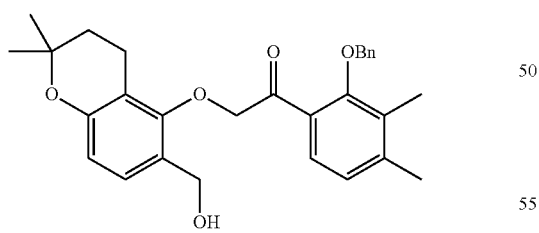
[Compound 4-97]
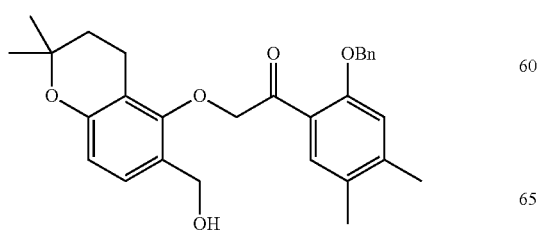
[Compound 4-98]
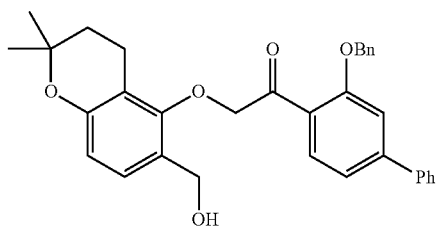
[Compound 4-99]
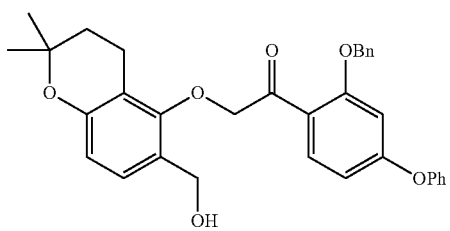
[Compound 4-100]
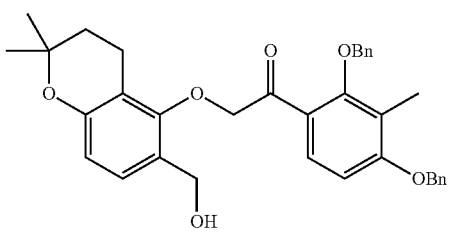
[Compound 4-101]
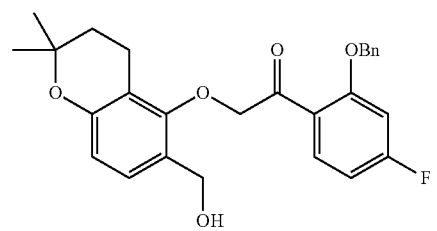
[Compound 4-102]
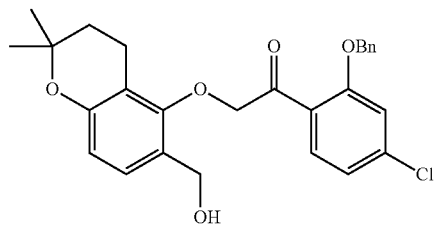
[Compound 4-103]
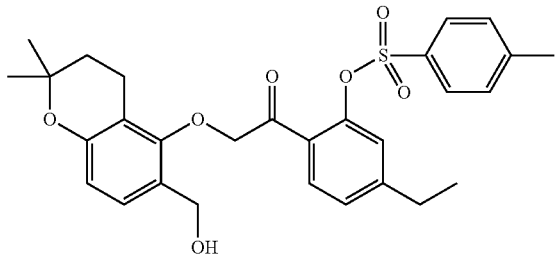

[Compound 4-104]
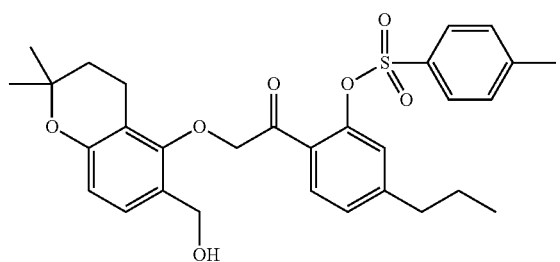
[Compound 4-105]
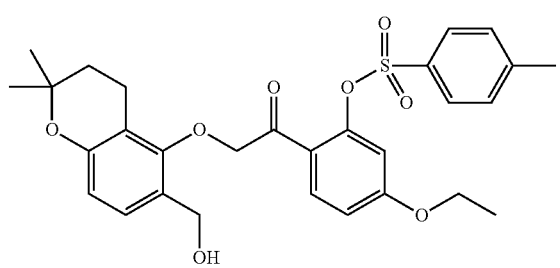
[Compound 4-106]
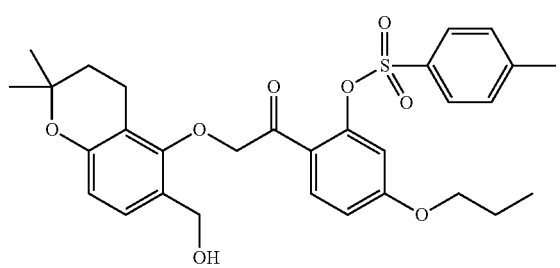
[Compound 4-107]
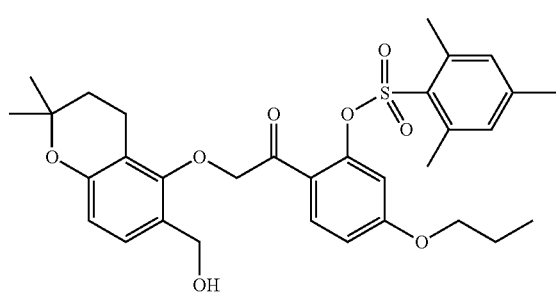
[Compound 4-108]
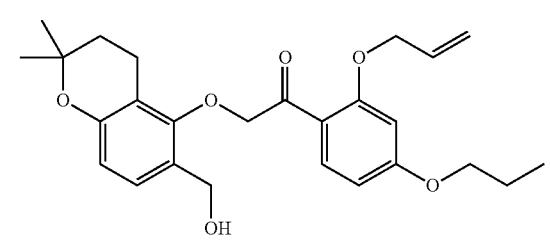
[Compound 4-109]
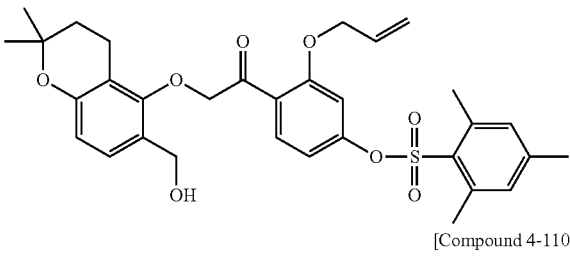
[Compound 4-110]
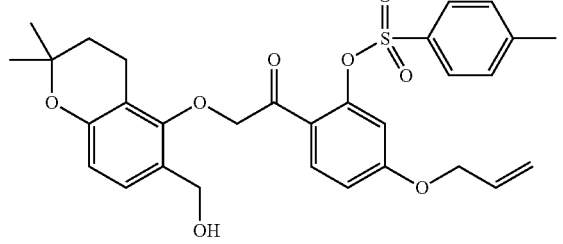
[Compound 4-111]
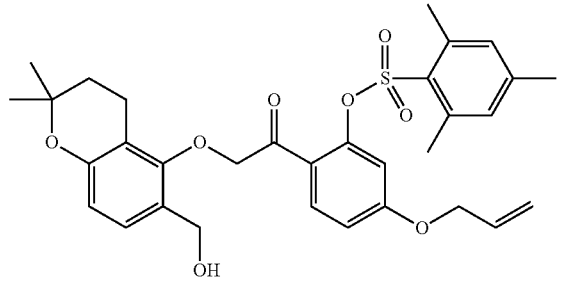
[Compound 4-112]
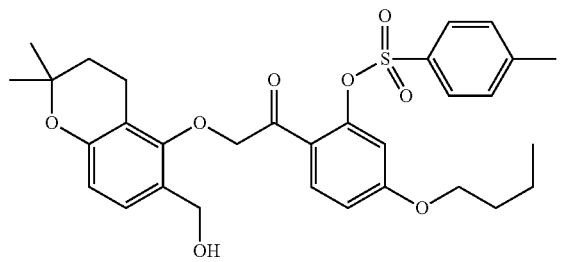
[Compound 4-113]
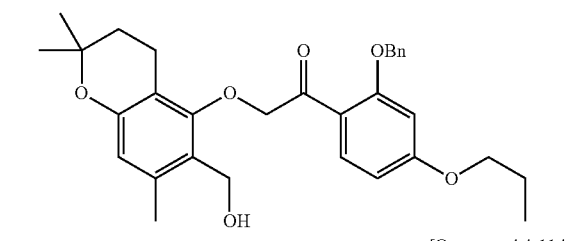
[Compound 4-114]
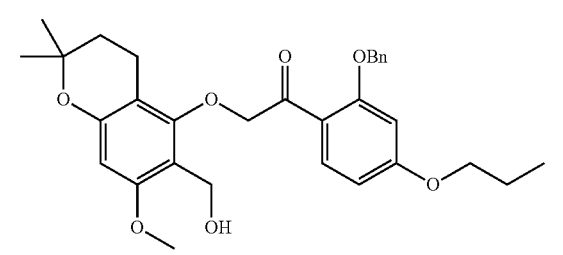

[Compound 4-115]
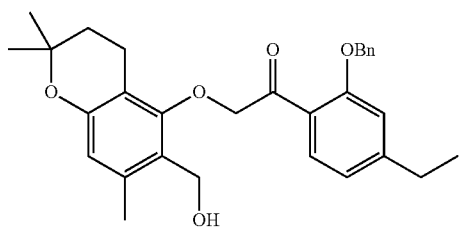
[Compound 4-116]
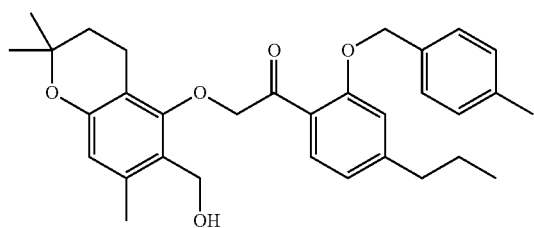
[Compound 4-117]
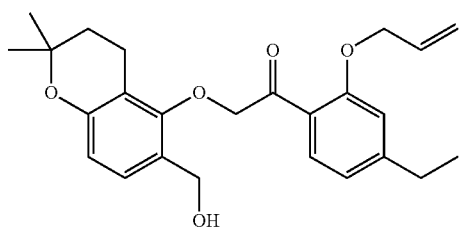
[Compound 4-118]
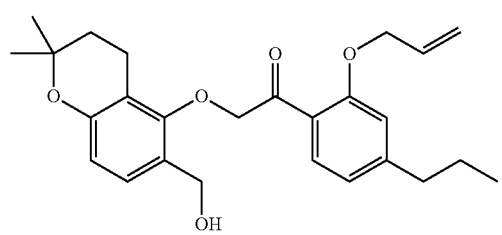
[Compound 4-119]
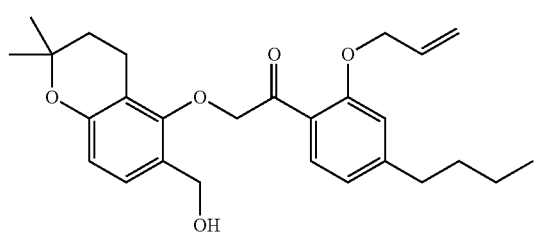
[Compound 4-120]
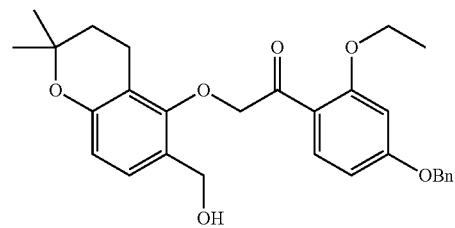
[Compound 4-121]
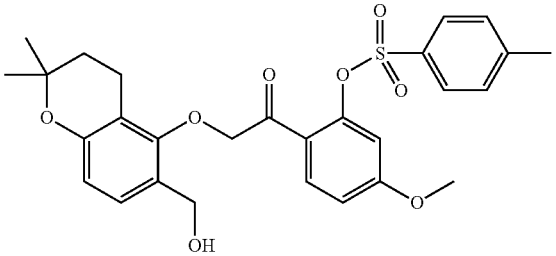
[Compound 4-122]
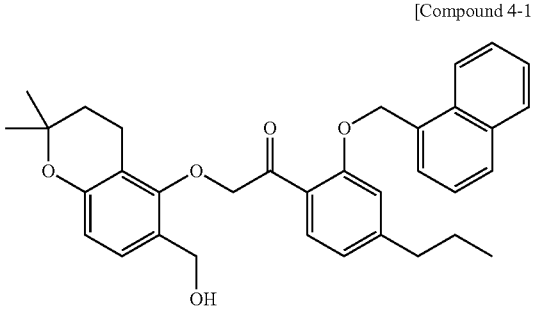
[Compound 4-123]
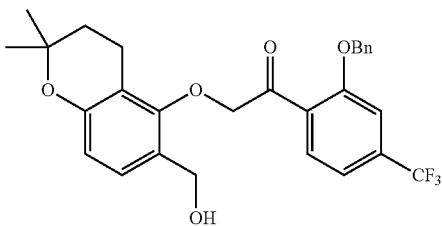
[Compound 4-124]
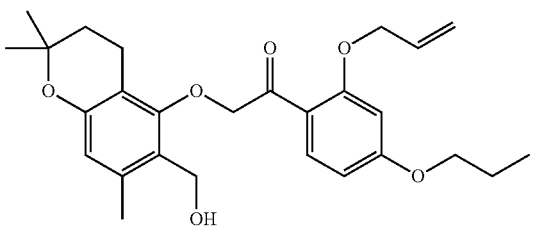
[Compound 4-125]
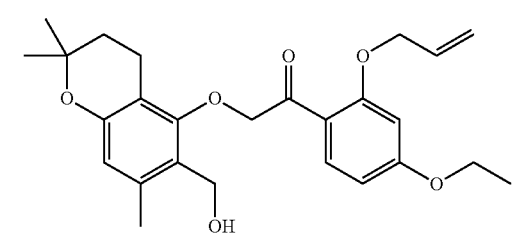
[Compound 4-126]
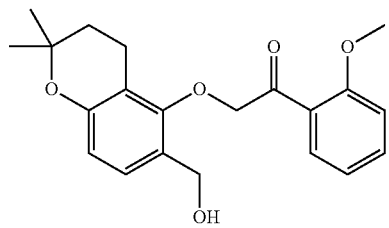

[Compound 4-127]

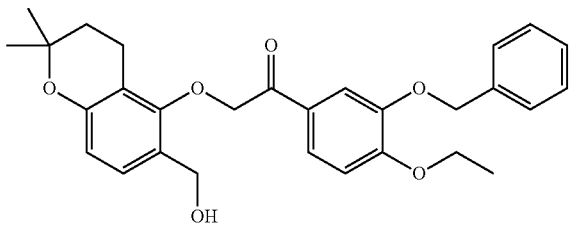

[Compound 4-128]

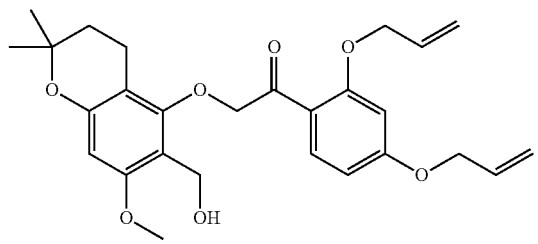

[Compound 4-129]

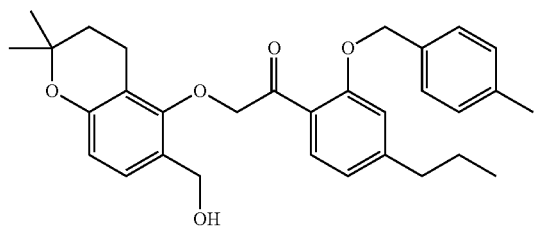

[Compound 4-130]

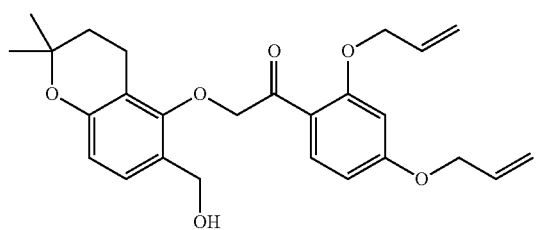

[Compound 4-131]

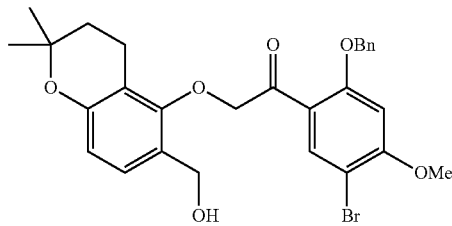

[Compound 4-132]

Hereinafter, each step of the method for synthesizing the compound of Formula 4 according to one embodiment of the present invention will be described in more detail.

Step (a) according to one embodiment of the present invention is a step of reducing the formyl group (—COH) of the compound of Formula 1 to produce the compound of Formula 2. The reduction may be performed at 0° C. to 5° C. using a reducing agent, for example, sodium borohydride, lithium aluminum hydride, diisobutylaluminum hydride, or the like. Specifically, the reducing agent may be sodium borohydride or lithium aluminum hydride. As described in the "Background Art" section above, the step of reducing the compound of Formula A-3 to the compound of Formula A-4 in Patent Document 2 has a problem in that a reaction-selective reducing agent should be used at a cryogenic temperature, because only the formyl group should be selectively reduced without reducing the carbonyl group of ketone. However, according to the synthesis method of the present invention, the compound of Formula 1 is first reduced, and thus the compound of Formula 4 may be easily produced under mild conditions without using a reaction-selective reducing agent.

According to one embodiment of the present invention, step (b) may be performed under a basic condition. For example, step (b) may be performed using a basic compound.

According to one embodiment of the present invention, the basic condition may be formed by adding at least one basic compound selected from among sodium hydroxide (NaOH), potassium hydroxide (KOH), sodium carbonate ($Na_2CO_3$), lithium carbonate ($Li_2CO_3$), potassium carbonate ($K_2CO_3$), sodium hydrogen carbonate ($NaHCO_3$), potassium hydrogen carbonate ($KHCO_3$), triethylamine, and pyridine, specifically, potassium carbonate or sodium carbonate.

Another embodiment of the present invention provides a method for synthesizing a 3-phenyl-2,3,4,8,9,10-hexahydropyrano[2,3-f]chromene derivative of Formula I, the method comprising steps of: (i) cyclizing the compound of Formula 4, produced according to one embodiment of the present invention, to produce a compound of Formula 5; and (ii) reducing the compound of Formula 5:

[Reaction Scheme 2]

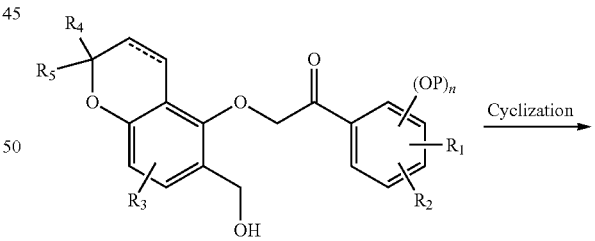

[Formula 4]

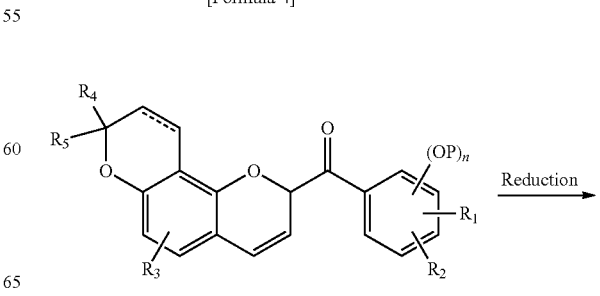

[Formula 5]

-continued

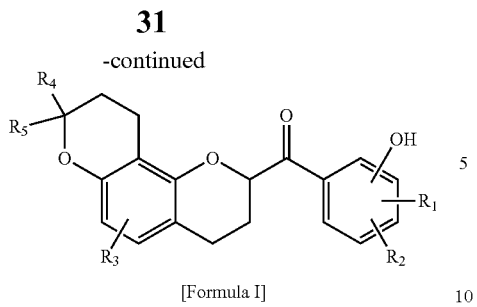

[Formula I]

wherein the dotted line is an optional double bond, and $R_1$ to $R_5$, P and n are the same as defined in Formulas 1 to 4 above.

When the compound of Formula 4 is cyclized to the compound of Formula 5, the cyclization may be achieved by i) dissolving the compound of Formula 4 in acetonitrile, and adding triphenylphosphonium bromide (Ph$_3$P·HBr) thereto to obtain an intermediate, and ii) concentrating the intermediate of i), dissolving the concentrate, and adding sodium ethoxide (NaOEt) thereto.

In step (ii), the compound of Formula I may be synthesized by reducing the double bond in the compound of Formula 5 and removing the protecting group. The removal of the protecting group may be performed through a hydrogenation reaction using palladium on carbon (Pd/C) as a catalyst, which is the same as used in the reaction for reducing the double bond.

Still another embodiment of the present invention provides a 6-(hydroxymethyl)chromen-5-ol derivative represented by the following Formula 2 or a solvate thereof:

[Formula 2]

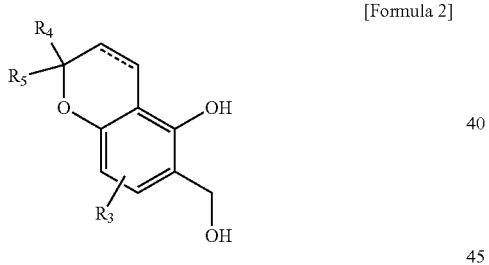

wherein $R_3$ is any one of a hydrogen atom, a $C_1$-$C_3$ alkyl group, a $C_1$-$C_3$ alkoxy group, and a halogen atom; and $R_4$ and $R_5$ are each independently any one of a hydrogen atom and a $C_1$-$C_2$ alkyl group.

Examples of the 6-(hydroxymethyl)chromen-5-ol derivative represented by Formula 2 include the following compounds.

[Compound 2-1]

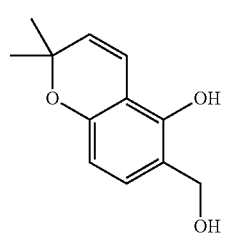

[Compound 2-2]

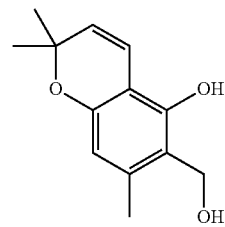

[Compound 2-3]

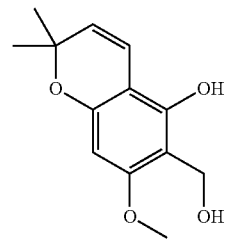

[Compound 2-4]

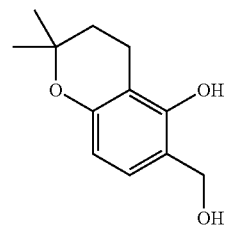

[Compound 2-5]

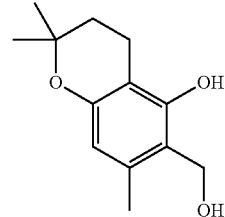

[Compound 2-6]

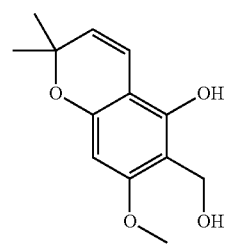

MODE FOR INVENTION

Hereinafter, the present invention will be described with reference to one or more examples. However, these examples serve to illustrate one or more embodiments, and the scope of the present invention is not limited to these examples.

Example 1. Production of 2-(6-(hydroxymethyl)-2,2-dimethyl-2H-chromen-5-yloxy)-1-(2-(benzyloxy)-4-ethoxyphenyl)ethanone (Compound 4-1)

1-1. Synthesis of 6-(hydroxymethyl)-2,2-dimethyl-2H-chromen-5-ol

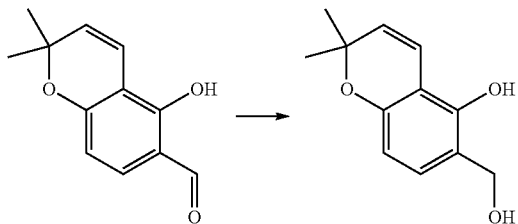

3 g (0.01469 mol) of 5-hydroxy-2,2-dimethyl-2H-chromene-6-carbaldehyde was added to 60 ml of methanol and cooled to a temperature of 0 to 5° C., and then 0.28 g (0.0074 mol) of sodium borohydride was added thereto in four portions. The reaction solution was warmed to room temperature and then stirred for an additional 30 minutes. After completion of the reaction, the reaction solution was concentrated, then 60 ml of ethyl acetate and 15 ml of purified water were added thereto, and the resulting solution was adjusted to a pH of 6 to 6.5 by slowly adding acetic acid thereto with vigorous stirring. After layer separation, the aqueous layer was removed and the organic layer was washed sequentially with 15 ml brine and 2% aqueous sodium bicarbonate solution. The organic layer was anhydrous processed, filtered, concentrated, and then recrystallized from n-hexane to obtain 2.37 g (78.2% yield) of 6-(hydroxymethyl)-2,2-dimethyl-2H-chromen-5-ol.
$^1$H-NMR and $^{13}$C-NMR results for the obtained compound are as follows.

$^1$H-NMR (CDCl$_3$): 7.596 (s, 1H), 6.715 (d, 1H, J=10 Hz), 6.686 (d, 1H, J=10 Hz), 6.287 (d, 1H, 8.4H), 5.587 (d, 1H, J=10 Hz), 4.746 (s, 2H), 2.296 (br, 1H), 1.412 (s, 6H).

$^{13}$C-NMR (CDCl$_3$): 153.842, 152.180, 129.192, 127.311, 116.803, 116.548, 110.336, 107.820, 75.957, 64.751, 27.730.

1-2. Synthesis of 2-(6-(hydroxymethyl)-2,2-dimethyl-2H-chromen-5-yloxy)-1-(2-(benzyloxy)-4-ethoxyphenyl) ethanone

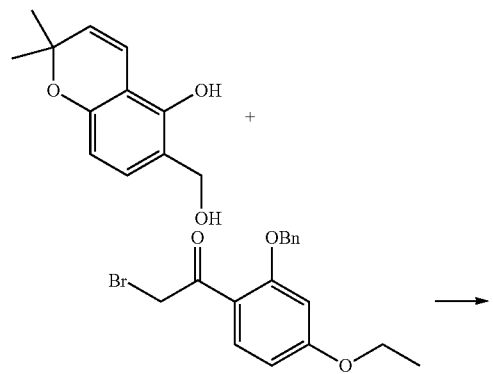

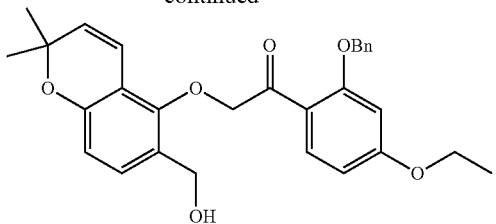

5 g (0.0242 mol) of 6-(hydroxymethyl)-2,2-dimethyl-2H-chromen-5-ol, 8.47 g (0.0242 mol) of 1-(2-(benzyloxy)-4-ethoxyphenyl)-2-bromoethanone, and 7.4 g (0.0535 mol) of potassium carbonate were added to 50 ml of acetone and stirred at room temperature overnight. After completion of the reaction, the reaction solution was filtered and the filtrate was completely concentrated. Methylene chloride was added to the concentrate which was then washed with purified water. Then, the organic layer was dried with anhydrous processed, concentrated, and crystallized from n-hexane to obtain 10.8 g (93.9% yield) of 2-(6-(hydroxymethyl)-2,2-dimethyl-2H-chromen-5-yloxy)-1-(2-(benzyloxy)-4-ethoxyphenyl)ethanone. 1H-NMR and $^{13}$C-NMR results for the obtained compound are as follows.

$^1$H-NMR (CDCl$_3$): 8.063 (d, 1H, J=8.8 Hz), 7.35-7.32 (m, 5H), 7.001 (d, 1H, J=8.4 Hz), 6.585 (dd, 1H, J=8.8, 2.0 Hz), 6.532 (d, 1H, J=8.0 Hz), 6.503 (d, 1H, J=2.0 Hz), 6.383 (d, 1H, J=10 Hz), 5.464 (d, 1H, J=9.6 Hz), 5.092 (s, 2H), 5.065 (s, 2H), 4.522 (s, 2H), 4.078 (q, 2H, J=13.6), 3.502 (br, 1H), 1.424 (t, 3H, J=6.8 Hz), 1.367 (s, 6H).

$^{13}$C-NMR (CDCl$_3$): 194.136, 164.785, 160.506, 154.276, 153.734, 135.384, 133.298, 130.280, 129.713, 128.772, 128.570, 127.905, 126.120, 117.735, 117.273, 114.343, 112.067, 106.684, 99.536, 80.734, 75.497, 70.927, 63.988, 61.479, 27.543, 14.594.

Example 2. Production of 2-(6-(hydroxymethyl)-2,2,7-trimethyl-2H-chromen-5-yloxy)-1-(2-(benzyloxy)-4-ethoxyphenyl)ethanone (Compound 4-2)

2-1. Synthesis of 6-(hydroxymethyl)-2,2,7-trimethyl-2H-chromen-5-ol

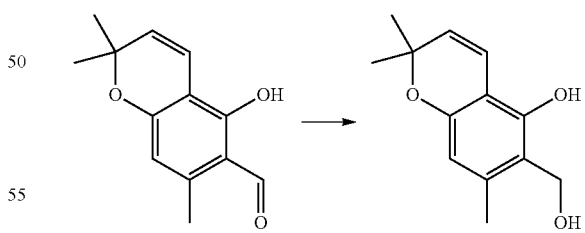

6-(hydroxymethyl)-2,2,7-trimethyl-2H-chromen-5-ol was obtained in the same manner as in Example 1-1 above, except that 5-hydroxy-2,2,7-trimethyl-2H-chromene-6-carbaldehyde was used instead of 5-hydroxy-2,2-dimethyl-2H-chromene-6-carbaldehyde. $^1$H-NMR and $^{13}$C-NMR results for the obtained compound are as follows.

$^1$H-NMR (CDCl$_3$): 8.066 (s, 1H), 6.648 (d, 1H, J=10 Hz), 6.167 (s, 1H), 5.525 (d, 1H, J=10 Hz), 4.827 (s, 2H), 2.401 (br, 1H), 2.132 (s, 3H), 1.399 (s, 6H).

$^{13}$C-NMR (CDCl$_3$): 152.863, 152.580, 135.759, 128.156, 116.639, 114.949, 109.944, 108.437, 75.880, 60.798, 27.735, 19.462.

2-2. Synthesis of 2-(6-(hydroxymethyl)-2,2,7-trimethyl-2H-chromen-5-yloxy)-1-(2-(benzyloxy)-4-ethoxyphenyl) ethanone

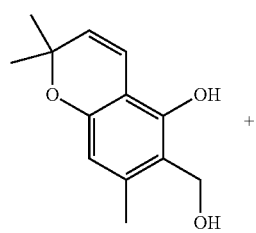

+

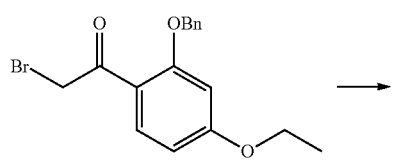

⟶

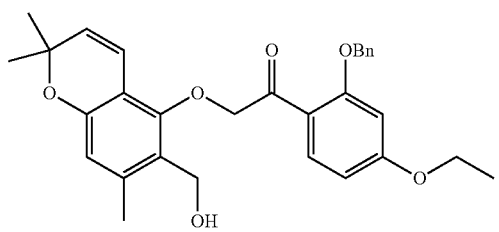

2-(6-(hydroxymethyl)-2,2,7-trimethyl-2H-chromen-5-yloxy)-1-(2-(benzyloxy)-4-ethoxyphenyl)ethanone was obtained in the same manner as in Example 1-2 above, except that 6-(hydroxymethyl)-2,2,7-trimethyl-2H-chromen-5-ol was used instead of 6-(hydroxymethyl)-2,2-dimethyl-2H-chromen-5-ol. 1H-NMR and $^{13}$C-NMR results for the obtained compound are as follows.

$^1$H-NMR (CDCl$_3$): 8.047 (d, 1H, J=8.8 Hz), 7.375-7.279 (m, 5H), 6.574 (dd, 1H, J=9.2, 2.4 Hz), 6.495 (d, 1H, J=2.4 Hz), 6.479 (s, 1H), 6.330 (d, 1H, J=10 Hz), 5.405 (d, 1H, J=9.6 Hz), 5.120 (s, 2H), 5.078 (s, 2H), 4.618 (d, 2H, J=6.4 Hz), 4.126~4.044 (m, 2H), 3.156 (br, 1H), 2.325 (s, 3H), 1.417 (t, 3H, J=7.2 Hz), 1.359 (s, 6H).

$^{13}$C-NMR (CDCl$_3$): 192.848, 164.723, 160.478, 154.581, 153.075, 139.010, 135.408, 133.229, 130.478, 129.135, 128.710, 128.665, 128.507, 127.920, 124.442, 117.383, 114.026, 111.674, 81.044, 75.421, 63.952, 56.773, 27.547, 19.331, 14.574.

Example 3. Production of 2-(6-(hydroxymethyl)-7-methoxy-2,2-dimethyl-2H-chromen-5-yloxy)-1-(2-(benzyloxy)-4-ethoxyphenyl)ethanone (Compound 4-3)

3-1. Synthesis of 6-(hydroxymethyl)-7-methoxy-2,2-dimethyl-2H-chromen-5-ol

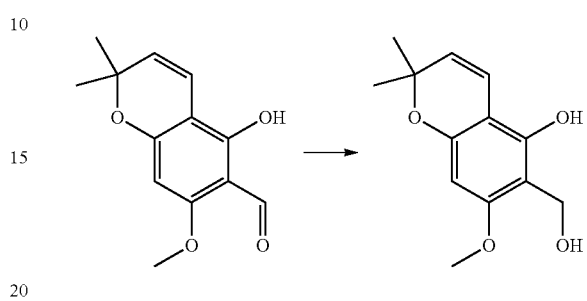

6-(hydroxymethyl)-7-methoxy-2,2-dimethyl-2H-chromen-5-ol was obtained in the same manner as in Example 1-1 above, except that 5-hydroxy-7-methoxy-2,2-dimethyl-2H-chromene-6-carbaldehyde was used instead of 5-hydroxy-2,2-dimethyl-2H-chromene-6-carbaldehyde.

$^1$H-NMR and $^{13}$C-NMR results for the obtained compound are as follows.

$^1$H-NMR (CD$_3$OD): 6.741 (d, 1H, J=9.6 Hz), 5.819 (s, 1H), 5.350 (d, 1H, J=9.6 Hz), 4.627 (s, 2H), 3.724 (s, 3H), 1.369 (s, 6H).

$^{13}$C-NMR (CD$_3$OD): 157.480, 154.814, 153.923, 124.960, 119.470, 107.049, 105.714, 90.203, 76.517, 58.645, 55.602, 27.885.

3-2. Synthesis of 2-(6-(hydroxymethyl)-7-methoxy-2,2-dimethyl-2H-chromen-5-yloxy)-1-(2-(benzyloxy)-4-ethoxyphenyl) ethenone

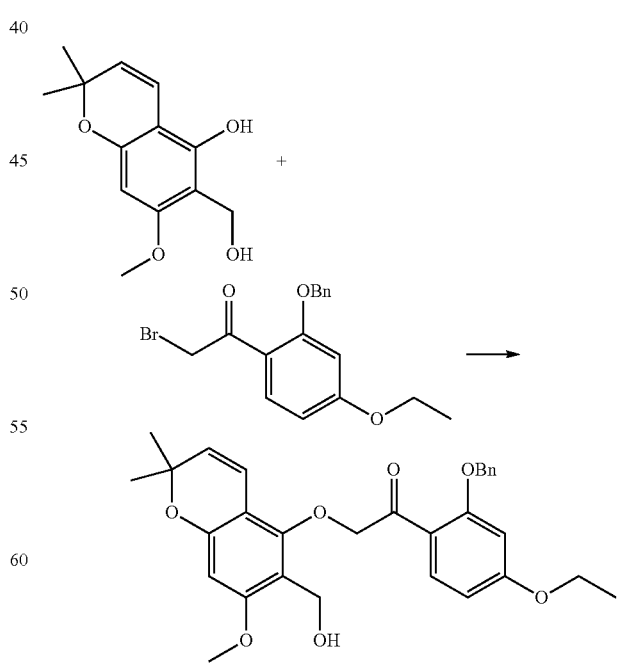

2-(6-(hydroxymethyl)-7-methoxy-2,2-dimethyl-2H-chromen-5-yloxy)-1-(2-(benzyloxy)-4-ethoxyphenyl)ethenone was obtained in the same manner as in Example 1-2 above, except that 6-(hydroxymethyl)-7-methoxy-2,2-dimethyl-2H-chromen-5-ol was used instead of 6-(hydroxymethyl)-2,2-dimethyl-2H-chromen-5-ol. $^1$H-NMR and $^{13}$C-NMR results for the obtained compound are as follows.

$^1$H-NMR (CDCl$_3$): 8.048 (d, 1H, J=8.8 Hz), 7.386-7.296 (m, 5H), 6.567 (dd, 1H, J=8.8, 2 Hz), 6.509 (s, 1H), 6.369 (d, 1H, J=10 Hz), 6.207 (s, 1H), 5.348 (d, 1H, J=10 Hz), 5.120 (s, 2H), 5.088 (s, 2H), 4.637 (d, 2H, J=6.8 Hz), 4.060 (q, 2H, J=14, 7.2 Hz), 3.799 (s, 3H), 3.032 (t, 1H, J=6.4 Hz), 1.411 (t, 3H, J=6.8 Hz), 1.366 (s, 6H).

$^{13}$C-NMR (CDCl$_3$): 193.599, 164.605, 160.395, 158.879, 154.891, 154.317, 135.459, 133.157, 128.641, 128.364, 127.786, 127.088, 117.880, 117.249, 114.782, 107.335, 106.616, 99.520, 95.947, 81.138, 76.028, 70.810, 63.914, 55.636, 54.542, 27.569, 14.561.

In addition, various 2-((6-(hydroxymethyl)chromen-5-yl)oxy)-1-phenylethanone derivatives shown in Table 1 below were synthesized in the same manner as in Example 1.

TABLE 1

| | Chemical structure | NMR |
|---|---|---|
| Example 1 | [Compound 4-1] 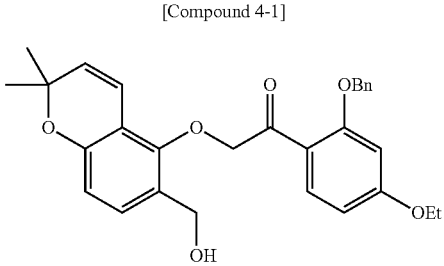 [SMILES: CCOc1ccc(C(=O)COc2c(CO)ccc3c2C=CC(C)(C)O3)c(OCc2ccccc2)c1] | $^1$H-NMR (CDCl$_3$): 8.063 (d, 1H, J = 8.8 Hz), 7.35~7.32 (m, 5H), 7.001 (d, 1H, J = 8.4 Hz), 6.585 (dd, 1H, J = 8.8, 2.0 Hz), 6.532 (d, 1H, J = 8.0 Hz), 6.503 (d, 1H, J = 2.0 Hz), 6.383 (d, 1H, J = 10 Hz), 5.464 (d, 1H, J = 9.6 Hz), 5.092 (s, 2H), 5.065 (s, 2H), 4.522 (s, 2H), 4.078 (q, 2H, J = 13.6), 3.502 (br, 1H), 1.424 (t, 3H, J = 6.8 Hz), 1.367 (s, 6H) $^{13}$C-NMR (CDCl$_3$): 194.136, 164.785, 160.506, 154.276, 153.734, 135.384, 133.298, 130.280, 129.713, 128.772, 128.570, 127.905, 126.120, 117.735, 117.273, 114.343, 112.067, 106.684, 99.536, 80.734, 75.497, 70.927, 63.988, 61.479, 27.543, 14.594 |
| Example 2 | [Compound 4-2] 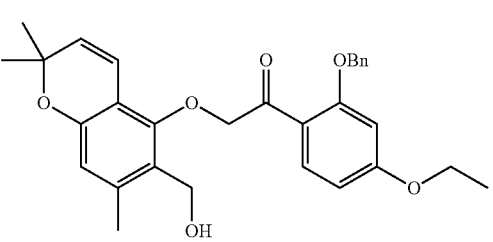 | $^1$H-NMR (CDCl$_3$): 8.047 (d, 1H, J = 8.8 Hz), 7.375~7.279 (m, 5H), 6.574 (dd, 1H, J = 9.2, 2.4 Hz), 6.495 (d, 1H, J = 2.4 Hz), 6.479 (s, 1H), 6.330 (d, 1H, J = 10 Hz), 5.405 (d, 1H, J = 9.6 Hz), 5.120 (s, 2H), 5.078 (s, 2H), 4.618 (d, 2H, J = 6.4 Hz), 4.126~4.044 (m, 2H), 3.156 (br, 1H), 2.325 (s, 3H), 1.417 (t, 3H, J = 7.2 Hz), 1.359 (s, 6H) $^{13}$C-NMR (CDCl$_3$): 192.848, 164.723, 160.478, 154.581, 153.075, 139.010, 135.408, 133.229, 130.478, 129.135, 128.710, 128.665, 128.507, 127.920, 124.442, 117.383, 114.026, 111.674, 81.044, 75.421, 63.952, 56.773, 27.547, 19.331, 14.574 |
| Example 3 | [Compound 4-3] 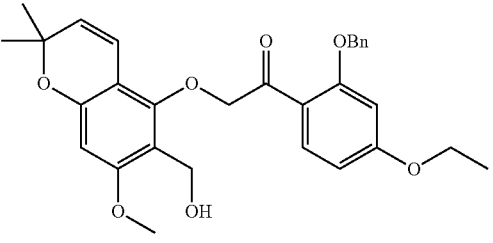 | $^1$H-NMR (CDCl$_3$): 8.048 (d, 1H, J = 8.8 Hz), 7.386~7.296 (m, 5H), 6.567 (dd, 1H, J = 8.8, 2 Hz), 6.509 (s, 1H), 6.369 (d, 1H, J = 10 Hz), 6.207 (s, 1H), 5.348 (d, 1H, J =10 Hz), 5.120 (s, 2H), 5.088 (s, 2H), 4.637 (d, 2H, J = 6.8 Hz), 4.060 (q, 2H, J = 14, 7.2 Hz), 3.799 (s, 3H), 3.032 (t, 1H, J = 6.4 Hz), 1.411 (t, 3H, J = 6.8 Hz), 1.366 (s, 6H) $^{13}$C-NMR (CDCl$_3$): 193.599, 164.605, 160.395, 158.879, 154.891, 154.317, 135.459, 133.157, 128.641, 128.364, 127.786, 127.088, 117.880, 117.249, 114.782, 107.335, 106.616, 99.520, 95.947, 81.138, 76.028, 70.810, 63.914, 55.636, 54.542, 27.569, 14.561 |
| Example 4 | [Compound 4-4] 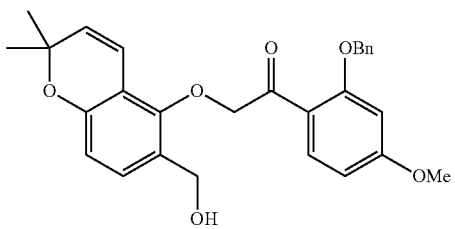 | $^1$H-NMR (CDCl$_3$): 8.074 (d, 1H, J = 8.8 Hz), 7.32~7.39 (m, 5H), 7.010 (d, 1H, J = 8.0 Hz), 6.599 (dd, 1H, J = 8.8, 2.0 Hz), 6.533 (d, 1H, J = 8.0 Hz), 6.506 (d, 1H, J = 2.0 Hz), 6.384 (d, 1H, J = 10.0 Hz), 5.467 (d, 1H, J = 10.0 Hz), 5.132 (s, 2H), 5.097 (s, 2H), 4.523 (d, 2H, J = 6.4 Hz), 3.844 (s, 3H), 3.520 (t, 1H, J = 6.4 Hz), 1.368 (s, 6H) $^{13}$C-NMR (CDCl$_3$): 194.139, 165.340, 160.469, 154.230, 153.719, 135.322, 133.295, 130.284, 129.700, 128.760, 128.571, 127.896, 126.099, 117.908, 117.245, 114.330, 112.064, 106.223, 99.169, 80.718, 75.488, 70.941, 61.432, 55.627, 27.528 |

TABLE 1-continued

| | Chemical structure | NMR |
|---|---|---|
| Example 5 | [Compound 4-5] | $^1$H-NMR (CDCl$_3$): 8.06 (d, 1H, J = 8.8 Hz), 7.355~7.340 (m, 5H), 7.006 (d, 1H, J = 8 Hz), 6.587 (dd, 1H, J = 8.8, 1.6 Hz), 6.539 (s, 1H), 6.514 (s, 1H), 6.376 (d, 1H, J = 9.6 Hz), 5.458 (d, 1H, J = 10 Hz), 5.125 (s, 2H), 5.091 (s, 2H), 4.519 (s, 2H), 3.961 (t, 2H, J = 6.8), 3.599 (br, 1H), 1.855~1.7768 (m, 2H), 1.364 (s, 6H), 1.306 (t, 3H, J = 7.2 Hz) $^{13}$C-NMR (CDCl$_3$): 194.102, 164.977, 160.511, 154.234, 153.697, 135.367, 133.230, 130.249, 129.676, 128.736, 128.539, 127.905, 126.110, 117.653, 117.245, 114.316, 112.032, 106.766, 99.466, 80.709, 75.467, 70.922, 69.902, 61.415, 27.518, 22.342, 10.388 |
| Example 6 | [Compound 4-6] | $^1$H-NMR (CDCl$_3$): 8.057 (d, 1H, J = 8.8 Hz), 7.378~7.324 (m, 5H), 7.008 (d, 1H, J = 8 Hz), 6.575 (dd, 1H, J = 8.8, 2 Hz), 6.530 (d, 1H, J = 8 Hz), 6.484 (d, 1H, J = 2.4 Hz), 6.380 (d, 1H, J = 10 Hz), 5.461 (d, 1H, J = 9.6 Hz), 5.128 (s, 2H), 5.096 (s, 2H), 4.645~4.585 (m, 1H), 4.522 (d, 2H, J = 4 Hz), 3.555 (br, 1H), 1.366 (s, 6H), 1.350 (s, 3H), 1.335 (s, 3H) $^{13}$C-NMR (CDCl$_3$): 195.066, 163.881, 160.601, 154.263, 153.714, 135.417, 133.222, 130.254, 129.692, 128.751, 128.532, 127.869, 126.117, 117.443, 117.263, 114.327, 112.039, 107.420, 100.503, 80.709, 75.476, 70.903, 70.408, 61.439, 27.526, 21.860 |
| Example 7 | [Compound 4-7] | $^1$H-NMR (CDCl$_3$): 8.06 (d, 1H, J = 8.8 Hz), 7.356~7.342 (m, 5H), 7.006 (d, 1H, J = 8.4 Hz), 6.571 (dd, 1H, J = 8.8, 1.6 Hz), 6.558 (d, 1H, J = 14.4 Hz), 6.513 (d, 1H, J = 4.4 Hz), 6.375 (d, 1H, J = 10 Hz), 5.458 (d, 1H, J = 10 Hz), 5.125 (s, 2H), 5.092 (s, 2H), 4.519 (d, 2H, J = 6.4 Hz), 4.004 (t, 2H, J = 11.2 Hz), 3.537 (t, 1H, J = 6.4 Hz), 1.803~1.749 (m, 2H), 1.532~1.409 (m, 2H), 1.365 (s, 6H), 0.977 (t, 3H, J = 7.2 Hz) $^{13}$C-NMR (CDCl$_3$): 194.120, 164.999, 160.515, 154.259, 153.713, 135.375, 133.257, 130.258, 129.697, 128.751, 128.558, 127.923, 126.113, 117.645, 114.325, 112.044, 106.759, 99.471, 80.722, 75.478, 70.928, 68.142, 61.453, 31.020, 27.528, 19.109, 13.759 |
| Example 8 | [Compound 4-8] | $^1$H-NMR (CDCl$_3$): 8.059 (d, 1H, J = 8.8 Hz), 7.355~7.324 (m, 5H), 7.006 (d, 1H, J = 8 Hz), 6.589 (dd, 1H, J = 8, 2 Hz), 6.529 (d, 1H, J = 8 Hz), 6.505 (d, 1H, J = 2 Hz), 6.375 (d, 1H, J = 10 Hz), 5.458 (d, 1H, J = 10 Hz), 5.125 (s, 2H), 5.091 (s, 2H), 4.519 (s, 2H), 3.995 (t, 2H, J = 6.4 Hz), 3.544 (br, 1H), 1.805-1.752 (m, 2H), 1.455~1.388 (m, 4H), 1.365 (s, 6H), 0.935 (t, 3H, J = 6.8 Hz) $^{13}$C-NMR (CDCl$_3$): 194.117, 164.992, 160.515, 154.262, 153.715, 135.379, 133.258, 130.260, 129.697, 128.752, 128.557, 127.923, 126.117, 117.651, 117.651, 114.329, 112.047, 106.760, 99.474, 80.725, 75.479, 70.931, 68.448, 61.453, 28.694, 28.109, 27.532, 22.363, 13.961 |

TABLE 1-continued

| | Chemical structure | NMR |
|---|---|---|
| Example 9 | [Compound 4-9] | $^1$H-NMR (CDCl$_3$): 8.061 (d, 1H, J = 8.8 Hz), 7.382~7.325 (m, 5H), 7.007 (d, 1H, J = 8 Hz), 6.588 (dd, 1H, J = 8.8, 2.4 Hz), 6.530 (d, 1H, J = 8.4 Hz), 6.506 (d, 1H, J = 2 Hz), 6.377 (d, 1H, J = 10 Hz), 5.459 (d, 1H, J = 9.6 Hz), 5.126 (s, 2H), 5.093 (s, 2H), 4.519 (d, 2H, J = 6.8 Hz), 3.996 (t, 2H, J = 6.4 Hz), 3.527 (t, 1H, J = 6.8 Hz), 1.798~1.744 (m, 2H), 1.465~1.316 (m, 6H), 1.366 (s, 6H), 0.910 (t, 3H, J = 5.6 Hz) $^{13}$C-NMR CDCl$_3$): 194.114, 164.998, 160.517, 154.252, 153.714, 135.382, 133.29, 130.257, 129.695, 128.747, 128.551, 127.917, 126.115, 117.656, 117.258, 114.327, 112.046, 106.773, 99.479, 80.720, 75.478, 70.934, 68.463, 61.438, 31.460, 28.959, 27.530, 25.569, 22.527, 13.983 |
| Example 10 | [Compound 4-10] | $^1$H-NMR (CDCl$_3$): 8.063 (d, 1H, J = 8.8 Hz), 7.364~7.319 (m, 5H), 7.005 (d, 1H, J = 8.4 Hz), 6.607 (dd, 1H, J = 8.8, 2 Hz), 6.577 (d, 1H, J = 2 Hz), 6.529 (d, 1H, J = 8.4 Hz), 6.379 (d, 1H, J = 10 Hz), 5.463 (d, 1H, J = 10 Hz), 5.125 (s, 2H), 5.081 (s, 2H), 4.516 (s, 2H), 4.162 (d, 2H, J = 5.2, 3.2 Hz), 3.748 (d, 2H, J = 5.2, 3.2 Hz), 3.445 (br, 1H), 3.435 (s, 3H), 1.364 (s, 6H) $^{13}$C-NMR (CDCl$_3$): 194.140, 164.523, 160.419, 154.227, 153.735, 135.332, 133.278, 130.305, 129.702, 128.762, 128.569, 127.883, 126.104, 118.112, 117.241, 114.353, 112.089, 106.535, 99.968, 80.731, 75.504, 70.966, 70.662, 67.612, 61.447, 59.236, 27.546 |
| Example 11 | [Compound 4-11] | $^1$H-NMR (CDCl$_3$): 8.074 (d, 1H, J = 8.8 Hz), 7.411~7.340 (m, 10H), 7.011 (d, 1H, J = 8 Hz), 6.682 (dd, 1H, J = 8.8, 2 Hz), 6.592 (d, 1H, J = 2 Hz), 6.536 (d, 1H, J = 8 Hz), 6.384 (d, 1H, J = 10 Hz), 5.468 (d, 1H, J = 10 Hz), 5.130 (s, 2H), 5.106 (s, 2H), 5.073 (s, 2H), 4.522 (d, 2H, J = 5.2 Hz), 3.444 (br, 1H), 1.370 (s, 6H) $^{13}$C-NMR (CDCl$_3$): 194.140, 164.450, 160.458, 154.252, 153.753, 135.848, 135.315, 133.317, 130.312, 129.727, 128.782, 128.738, 128.594, 128.373, 127.903, 127.519, 126.110, 118.138, 117.261, 114.358, 112.102, 107.104, 100.031, 80.742, 75.512, 70.981, 70.381, 61.477, 27.556 |
| Example 12 | [Compound 4-12] | $^1$H-NMR (CDCl$_3$): 8.051 (d, 1H, J = 8.8 Hz), 7.439~7.350 (m, 5H), 7.055 (d, 1H, J = 8.4 Hz), 6.664 (dd, 1H, J = 8.8, 2.4 Hz), 6.614 (d, 1H, J = 10 Hz), 6.572 (d, 1H, J = 10 Hz), 6.515 (d, 1H, J = 2 Hz), 5.655 (d, 1H, J = 9.6 Hz), 5.161 (s, 2H), 5.120 (s, 2H), 4.168 (d, 2H, J = 2.8 Hz), 3.830 (s, 3H), 3.610 (br, 1H), 1.426 (s, 6H) $^{13}$C-NMR (CDCl$_3$): 194.073, 164.558, 161.291, 154.335, 153.806, 135.859, 133.217, 130.426, 129.721, 128.712, 128.578, 127.523, 126.169, 117.842, 117.449, 114.622, 112.180, 106.662, 98.960, 80.4778, 75.628, 70.351, 61.520, 55.518, 27.555 |

TABLE 1-continued

| | Chemical structure | NMR |
|---|---|---|
| Example 13 | [Compound 4-13] 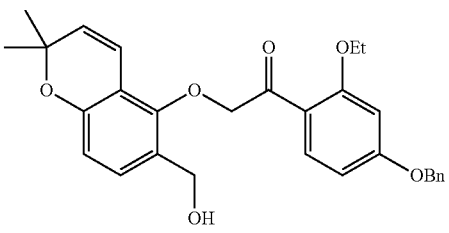 | ¹H-NMR (CDCl₃): 8.055 (d, 1H, J = 8.8 Hz), 7.425~7.345 (m, 5H), 7.037 (d, 1H, J = 8.4 Hz), 6.646 (dd, 1H, J = 8.8, 2 Hz), 6.610 (d, 1H, J = 10 Hz), 6.556 (d, 1H, J = 8 Hz), 6.479 (d, 1H, J = 2 Hz), 5.655 (d, 1H, J = 10 Hz), 5.229 (s, 2H), 5.105 (s, 2H), 4.643 (s, 2H), 4.127 (br, 1H), 4.058 (q, 2H, J = 14 Hz), 1.434 (t, 3H, J = 5.6 Hz), 1.417 (s, 6H) <br> ¹³C-NMR (CDCl₃): 194.514, 164.547, 160.795, 154.849, 153.833, 135.869, 133.204, 130.221, 129.790, 128.700, 128.328, 127.499, 126.189, 117.822, 114.303, 111.932, 106.680, 99.441, 80.741, 75.368, 70.308, 64.232, 61.752, 27.379, 14.710 |
| Example 14 | [Compound 4-14] 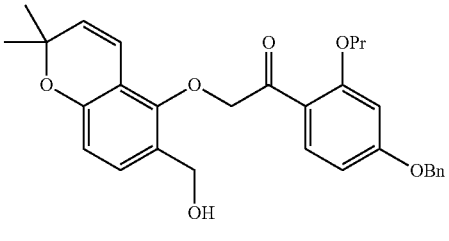 | ¹H-NMR (CDCl₃): 8.063 (d, 1H, J = 8.8 Hz), 7.412~7.362 (m, 5H), 7.039 (d, 1H, J = 8.4 Hz), 6.648 (dd, 1H, J = 8.8, 2 Hz), 6.593 (d, 1H, J = 10 Hz), 6.558 (d, 1H, J = 8.4 Hz), 6.493 (d, 1H, J = 2.4 Hz), 5.646 (d, 1H, J = 9.6 Hz), 5.219 (s, 2H), 5.109 (s, 2H), 4.631 (s, 2H), 4.2 (br, 1H), 3.955 (t, 2H, J = 6.8 Hz), 1.832~1.814 (m, 2H), 1.426 (s, 6H), 1.012 (t, 3H, 7.6 Hz) <br> ¹³C-NMR (CDCl₃): 194.386, 164.551, 160.892, 154.701, 153.796, 135.888, 133.258, 130.245, 129.784, 128.699, 128.546, 127.503, 126.244, 117.782, 117.662, 114.387, 112.016, 106.630, 99.476, 80.696, 75.409, 70.322, 61.716, 27.424, 22.400, 10.871 |
| Example 15 | [Compound 4-15] 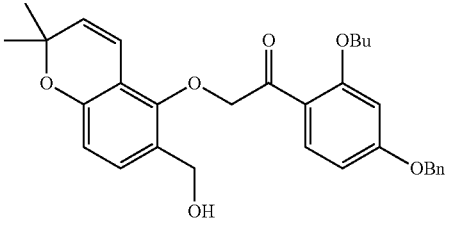 | ¹H-NMR (CDCl₃): 8.063 (d, 1H, J = 8.8 Hz), 7.433~7.336 (m, 5H), 7.043 (d, 1H, J = 8 Hz), 6.648 (dd, 1H, J = 8.8, 2.4 Hz), 6.602 (d, 1H, J = 10 Hz), 6.559 (d, 1H, J = 8 Hz), 6.497 (d, 1H, J = 2.4 Hz), 5.648 (d, 1H, J = 9.6 Hz), 5.208 (s, 2H), 5.110 (s, 2H), 4.629 (d, 2H, J = 3.6 Hz), 3.990 (m, 3H), 1.815~1.744 (m, 2H), 1.486-1.396 (m, 8H), 0.928 (t, 3H, 7.2 Hz) <br> ¹³C-NMR (CDCl₃): 194.341, 164.543, 160.890, 154.634, 153.788, 135.888, 133.253, 130.303, 129.791, 128.699, 128.327, 127.509, 126.250, 117.781, 117.605, 114.379, 112.049, 106.595, 99.491, 80.697, 75.443, 70.318, 68.405, 61.678, 30.997, 27.495, 19.337, 13.709 |
| Example 16 | [Compound 4-16] 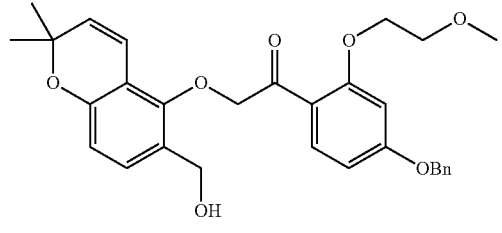 | ¹H-NMR (CDCl₃): 8.069 (d, 1H, J = 8.8 Hz), 7.426~7.347 (m, 5H), 7.062 (d, 1H, J = 8 Hz), 6.688-6.652 (m, 2H), 6.558 (d, 1H, J = 8.4 Hz), 6.487 (d, 1H, J = 2.4 Hz), 5.641 (d, 1H, J = 10 Hz), 5.224 (s, 2H), 5.110 (s, 2H), 4.614 (d, 2H, J = 6.4 Hz), 4.122 (t, 2H, J = 4.8 Hz), 3.693~3.620 (m, 3H), 3.228 (s, 3H), 1.420 (s, 6H) <br> ¹³C-NMR (CDCl₃): 194.068, 164.393, 160.4485, 154.308, 153.700, 135.851, 133.172, 130.359, 129.823, 128.703, 128.336, 127.495, 126.260, 118.109, 117.483, 114.640, 112.187, 107.077, 99.757, 80.789, 75.629, 703.70, 70.335, 67.570, 61.340, 58.674, 27.617 |

TABLE 1-continued

| | Chemical structure | NMR |
|---|---|---|
| Example 17 | [Compound 4-17] | ¹H-NMR (CDCl₃): 7.971 (d, 1H, J = 8 Hz), 7.433~7.339 (m, 5H), 7.011 (d, 1H, J = 8.4 Hz), 6.924 (d, 1H, J = 8 Hz), 6.865 (s, 1H), 6.538 (d, 1H, J = 8.4 Hz), 6.389 (d, 1H, J = 10 Hz), 5.475 (d, 1H, J = 10 Hz), 5.138 (d, 2H, J = 8 Hz), 4.515 (s, 2H), 3.310 (br, 1H), 2.707~2.619 (m, 2H), 1.369 (s, 6H), 1.245 (t, 3H, J = 7.6 Hz) ¹³C-NMR (CDCl₃): 195.369, 158.868, 153.761, 152.515, 135.625, 131.324, 130.363, 129.697, 128.738, 128.509, 127.499, 126.083, 122.421, 121.132, 117.210, 114.408, 112.166, 112.135, 80.841, 75.540, 70.913, 61.402, 29.204, 27.859, 15.014 |
| Example 18 | [Compound 4-18] | ¹H-NMR (CDCl₃): 8.168 (d, 2H, J = 8.8 Hz), 7.950 (d, 1H, J = 8 Hz), 7.545 (d, 2H, J = 8.8 Hz), 7.020 (d, 1H, J = 8.0 Hz), 6.959 (dd, 1H, J = 8, 1.2 Hz), 6.795 (s, 1H), 6.552 (d, 1H, J = 8 Hz), 6.428 (d, 1H, J = 9.6 Hz), 5.509 (d, 1H, J = 10 Hz), 5.233 (s, 2H), 5.131 (s, 2H), 4.532 (d, 2H, J = 6.4 Hz), 3.134 (t, 1H, J = 6.4 Hz), 2.671 (q, 2H, J = 15.2 Hz), 1.344 (s, 6H), 1.232 (t, 3H, J = 7.6 Hz), ¹³C-NMR (CDCl₃): 194.892, 158.011, 153.937, 152.558, 147.782, 142.812, 131.4406, 130.706, 129.797, 128.125, 127.519, 125.970, 123.970, 123.883, 122.518, 121.668, 116.946, 114.550, 113.201, 112.537, 112.045, 80.751, 75.627, 69.546, 61.309, 29.170, 27.497, 15.017 |
| Example 19 | [Compound 4-19] | ¹H-NMR (CDCl₃): 7.948 (d, 1H, J = 8 Hz), 7.065 (d, 1H, J = 8 Hz), 6.992 (d, 1H, J = 8 Hz), 6.758 (s, 1H), 6.618 (d, 1H, J = 10 Hz), 6.580 (d, 1H, J = 8 Hz), 5.660 (d, 1H, J = 10 Hz), 5.194 (s, 2H), 4.630 (d, 2H, J = 6 Hz), 3.875 (s, 3H), 3.431 (t, 1H, J = 6.4 Hz), 2.624 (t, 2H, J = 7.6 Hz), 1.692~1.617 (m, 2H), 1.431 (s, 6H), 0.955 (t, 3H, J = 7.2 Hz) ¹³C-NMR (CDCl₃): 195.352, 159.530, 154.279, 153.804, 151.120, 131.081, 130.458, 129.702, 126.156, 121.981, 121.410, 117.421, 114.635, 112.208, 111.466, 80.598, 75.635, 61.525, 55.410, 38.210, 27.544, 24.110, 13.755 |
| Example 20 | [Compound 4-20] | ¹H-NMR (CDCl₃): 7.967 (d, 1H, J = 8 Hz), 7.430~7.320 (m, 5H), 7.010 (d, 1H, J = 8 Hz), 6.998 (d, 1H, J = 8 Hz), 6.845 (s, 1H), 6.538 (d, 1H, J = 8 Hz), 6.387 (d, 1H, J = 10 Hz), 5.473 (d, 1H, J = 10 Hz), 5.163 (s, 2H), 5.153 (s, 2H), 4.514 (s, 2H), 3.389 (s, 1H), 2.611 (t, 2H, J = 7.6 Hz), 1.674~1.600 (m, 2H), 1.368 (s, 6H), 0.934 (t, 3H, J = 7.2 Hz) ¹³C-NMR (CDCl₃): 195.343, 158.738, 155.662, 154.090, 153.688, 151.024, 136.179, 131.156, 130.323, 129.651, 128.691, 128.463, 127.890, 126.045, 122.282, 121.682, 117.167, 114.350, 113.694, 112.657, 112.104, 80.826, 75.495, 70.824, 61.355 |
| Example 21 | [Compound 4-21] | ¹H-NMR (CDCl₃): 7.967 (d, 1H, J = 8 Hz), 7.306 (s, 4H), 7.025 (d, 1H, J = 8 Hz), 6.919 (dd, 1H, J = 8, 1.2 Hz), 6.811 (s, 1H), 6.558 (d, 1H, J = 8.4 Hz), 6.370 (d, 1H, J = 10 Hz), 5.493 (d, 1H, J = 10 Hz), 5.112 (s, 2H), 5.082 (s, 2H), 4.524 (s, 2H), 3.296 (br, 1H), 2.616 (t, 2H, J = 7.6 Hz), 1.697~1.604 (m, 4H), 1.377 (s, 6H), 0.940 (t, 3H, J = 7.6 Hz) |

TABLE 1-continued

| | Chemical structure | NMR |
|---|---|---|
| Example 22 | [Compound 4-22] | $^1$H-NMR (CDCl$_3$): 7.961 (d, 1H, J = 8 Hz), 7.401 (d, 1H, J = 2 Hz), 7.366 (d, 1H, J = 8 Hz), 7.227 (d, 1H, 2.4 Hz), 7.206 (d, 1H, J = 2 Hz), 7.026 (d, 1H, 8.4 Hz), 6.933 (dd, 1H, J = 8, 0.8 Hz), 6.804 (s, 1H), 6.556 (d, 1H, J = 8.4 Hz), 6.398 (d, 1H, J = 9.6 Hz), 5.504 (d, 1H, J = 10 Hz), 5.172 (s, 2H), 5.123 (s, 2H), 4.540 (s, 2H), 3.3 (br, 1H), 2.623 (t, 2H, J = 7.6 Hz), 1.684~1.610 (m, 4H), 1.382 (s, 6H), 0.944 (t, 3H, J = 7.2 Hz) |
| Example 23 | [Compound 4-23] | $^1$H-NMR (CDCl$_3$): 7.961 (d, 1H, J = 8 Hz), 7.245 (d, 2H, J = 8.8 Hz), 7.113 (d, 2H, J = 8 Hz), 7.007 (d, 1H, 8.4 Hz), 6.889 (dd, 1H, J = 8, 1.2 Hz), 6.842 (d, 1H, J = 1.2 Hz), 6.539 (dd, 1H, J = 8.4, 0.4 Hz), 6.392 (dd, 1H, J = 10, 0.8 Hz), 5.466 (d, 1H, J = 9.6 Hz), 5.124 (s, 2H), 5.067 (s, 2H), 4.504 (s, 2H), 3.3 (br, 1H), 2.611 (t, 2H, J = 7.6 Hz), 2.347 (s, 2H), 1.679~1.622 (m, 2H), 1.369 (s, 6H), 0.938 (t, 3H, J = 7.2 Hz) $^{13}$C-NMR (CDCl$_3$): 195.3316, 158.874, 154.093, 153.705, 151.006, 138.261, 132.530, 131.130, 130.271, 129.607, 129.336, 128.062, 126.084, 122.313, 121.608, 117.247, 114.379, 112.676, 112.071, 80.901, 75.477, 70.780, 61.354, 38.248, 27.491, 24.037, 21.170, 13.703 |
| Example 24 | [Compound 4-24] | $^1$H-NMR (CDCl$_3$): 8.154 (d, 2H, J = 8.4 Hz), 7.936 (d, 1H, J = 8 Hz), 7.538 (d, 2H, J = 8.8 Hz), 7.112 (d, 1H, 8 Hz), 6.930 (d, 1H, J = 8 Hz), 6.773 (s, 1H), 6.543 (d, 1H, J = 8 Hz), 6.423 (d, 1H, J = 10 Hz), 5.499 (d, 1H, J = 6 Hz), 5.225 (s, 2H), 5.129 (s, 2H), 4.504 (s, 2H), 3.240 (br, 1H), 2.600 (t, 2H, J = 7.6 Hz), 1.655~1.588 (m, 2H), 1.337 (s, 6H), 0.917 (t, 3H, J = 7.2 Hz) $^{13}$C-NMR (CDCl$_3$): 194.877, 157.904, 153.873, 153.719, 151.043, 147.723, 142.811, 131.228, 130.668, 129.761, 128.101, 125.952, 123.847, 122.482, 112.220, 121.974, 116.910, 114.515, 112.614, 112.494, 80.738, 75.536, 69.504, 61.207, 38.178, 27.461, 24.006, 13.641 |
| Example 25 | [Compound 4-25] | $^1$H-NMR (CDCl$_3$): 8.130 (dd, 1H, J = 8, 1.2 Hz), 7.907 (d, 1H, J = 8 Hz), 7.712 (d, 1H, J = 7.6 Hz), 7.594 (td, 1H, 7.6, 1.2 Hz), 7.497 (dd, 1H, J = 8.4, 1.6 Hz), 7.040 (d, 1H, J = 8 Hz), 6.927 (dd, 1H, J = 8, 1.2 Hz), 6.747 (s, 1H), 6.555 (d, 1H, J = 8.4 Hz), 6.485 (d, 1H, J = 9.6 Hz), 5.561 (s, 2H), 5.535 (d, 1H, J = 10 Hz), 5.183 (s, 2H), 4.576 (d, 2H, J = 5.6 Hz), 3.205 (br, 1H), 2.573 (t, 2H, J = 4 Hz), 1.636~1.579 (m, 2H), 1.359 (s, 6H), 0.906 (t, 3H, J = 7.6 Hz) $^{13}$C-NMR (CDCl$_3$): 195.109, 157.878, 153.977, 153.791, 151.084, 147.120, 134.110, 132.256, 131.117, 130.597, 129.793, 129.029, 128.971, 126.048, 125.171, 122.525, 122.189, 117.065, 114.542, 112.975, 112.387, 80.358, 75.657, 67.659, 38.190, 27.557, 24.064, 13.653 |

TABLE 1-continued

| | Chemical structure | NMR |
|---|---|---|
| Example 26 | [Compound 4-26] 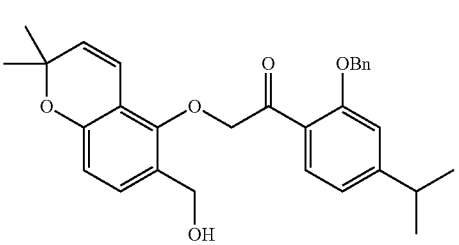 | ¹H-NMR (CDCl₃): 7.980 (d, 1H, J = 8.4 Hz), 7.388~7.322 (m, 5H), 7.012 (d, 1H, J = 8.4 Hz), 6.950 (dd, 1H, J = 8, 1.2 Hz), 6.889 (s, 1H), 6.540 (d, 1H, J = 8 Hz), 6.393 (d, 1H, J = 9.6 Hz), 5.478 (d, 1H, J = 10 Hz), 5.155 (s, 2H), 5.138 (s, 2H), 4.519 (d, 2H, J = 4.8 Hz), 3.381 (br, 1H), 2.928 (m, 1H), 1.400 (s, 6H), 1.261~1.215 (m, 6H) ¹³C-NMR (CDCl₃): 195.3327, 257.109, 154.077, 153.682, 131.276, 130.306, 129.642, 128.679, 128.457, 127.922, 126.031, 122.391, 119.581, 117.161, 114.329, 112.088, 80.805, 75.483, 61.319, 34.480, 27.502 |
| Example 27 | [Compound 4-27] 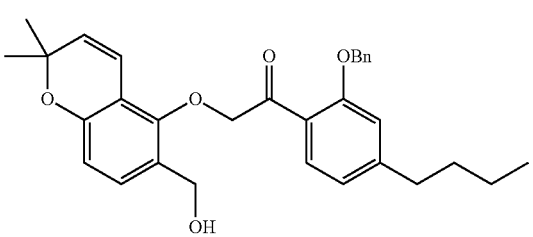 | ¹H-NMR (CDCl₃): 7.961 (d, 1H, J = 8 Hz), 7.359~7.279 (m, 5H), 7.011 (d, 1H, J = 8 Hz), 6.901 (d, 1H, J = 8 Hz), 6.842 (s, 1H), 6.539 (d, 1H, J = 8 Hz), 6.395 (d, 1H, J = 9.6 Hz), 5.476 (d, 1H, J = 9.6 Hz), 5.150 (s, 2H), 5.126 (s, 2H), 4.516 (d, 2H, J = 4.8 Hz), 3.302 (br, 1H), 2.634 (t, 2H, J = 7.6 Hz), 1.587 (m, 2H), 1.417~1.331 (m, 2H), 13.70 (s, 6H), 0.923 (t, 3H, J = 7.2 Hz) ¹³C-NMR (CDCl₃): 195.358, 158.764, 154.118, 153.717, 151.297, 135.582, 131.196, 130.340, 129.680, 128.711, 128.348, 127.909, 126.058, 122.263, 121.664, 117.189, 114.372, 112.629, 112.127, 80.842, 75.518, 70.840, 61.386, 35.941, 33.033, 27.534, 22.420, 13.857 |
| Example 28 | [Compound 4-28] 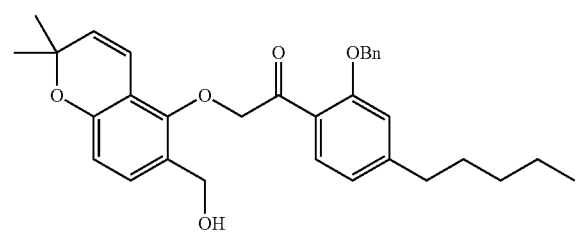 | ¹H-NMR (CDCl₃): 7.968 (d, 1H, J = 8 Hz), 7.369~7.208 (m, 5H), 7.011 (d, 1H, J = 8.4 Hz), 6.905 (d, 1H, J = 8 Hz), 6.840 (s, 1H), 6.539 (d, 1H, J = 8 Hz), 6.356 (d, 1H, J = 10 Hz), 5.474 (d, 1H, J = 9.6 Hz), 5.153 (s, 2H), 5.127 (s, 2H), 4.516 (d, 2H, J = 6.4 Hz), 3.298 (t, 1H, J = 6.8 Hz), 2.625 (t, 2H, J = 7.6 Hz), 1.626~1.592 (m, 2H), 1.417~1.216 (m, 10H), 0.887 (t, 3H, J = 6.4 Hz) |
| Example 29 | [Compound 4-29] 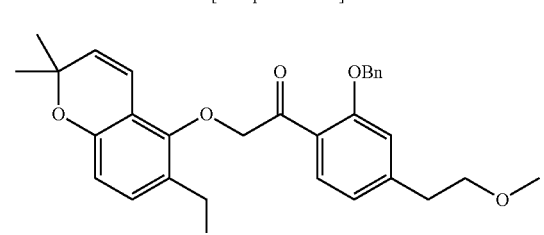 | ¹H-NMR (CDCl₃): 7.972 (d, 1H, J = 7.6 Hz), 7.405~7.322 (m, 5H), 7.012 (d, 1H, J = 8 Hz), 6.941 (d, 1H, J = 8.4 Hz), 6.925 (s, 1H), 6.540 (d, 1H, J = 8.4 Hz), 6.387 (d, 1H, J = 10 Hz), 5.479 (d, 1H, J = 10 Hz), 5.169 (s, 2H), 5.146 (s, 2H), 4.511 (d, 2H, J = 5.6 Hz), 3.608 (t, 2H, J = 6.4 Hz), 3.332 (s, 3H), 3.272 (br, 1H), 2.899 (t, 2H, J = 6.4 Hz), 1.416 (s, 6H) ¹³C-NMR (CDCl₃): 195.380, 158.685, 154.084 153.726, 147.462, 135.527, 131.269, 130.372, 129.687, 128.723, 128.506, 127.928, 126.041, 122.783, 121.901, 117.169, 114.367, 113.245, 112.154, 80.841, 75.527, 70.873, 61.375, 58.741, 36.433, 27.537 |
| Example 30 | [Compound 4-30] 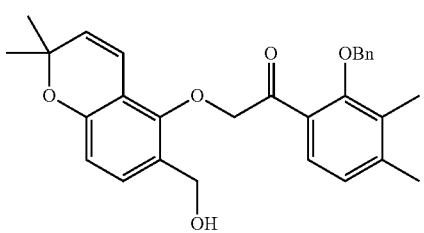 | ¹H-NMR (CDCl₃): 7.526 (d, 1H, J = 8 Hz), 7.496~7.291 (m, 5H), 7.270 (d, 1H, J = 8 Hz), 7.016 (d, 1H, J = 8.4 Hz), 6.546 (d, 1H, 8 Hz), 6.432 (d, 1H, J = 8 Hz), 5.498 (d, 1H, J = 10 Hz), 5.135 (s, 2H), 4.820 (s, 2H), 4.539 (s, 2H), 3.201 (br, 1H), 2.332 (s, 3H), 2.236 (s, 3H), 1.361 (s, 6H) |

TABLE 1-continued

| | Chemical structure | NMR |
|---|---|---|
| Example 31 | [Compound 4-31] 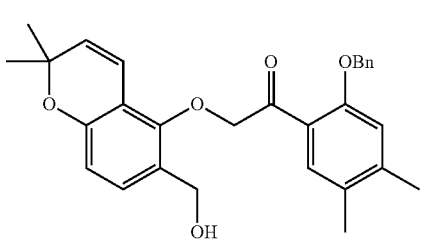 | $^1$H-NMR (CDCl$_3$): 7.804 (s, 1H), 7.346~7.334 (m, 5H), 7.010 (d, 1H, J = 8.4 Hz), 6.826 (s, 1H), 6.536 (d, 1H, J = 8 Hz), 6.398 (d, 1H, J = 10 Hz), 5.472 (d, 1H, J = 10 Hz), 5.147 (s, 2H), 5.096 (s, 2H), 4.517 (d, 2H, J = 3.6 Hz), 3.327 (br, 1H), 2.293 (s, 3H), 2.233 (s, 3H), 1.367 (s, 6H)<br>$^{13}$C-NMR (CDCl$_3$): 195.485, 156.948, 154.1449, 153.705, 144.902, 135.781, 131.672, 130.322, 129.657, 128.695, 128.409, 127.827, 126.078, 121.959, 117.197, 114.379, 114.009, 112.105, 80.880, 75.510, 70.948, 61.410, 27.529, 20.534, 18.974 |
| Example 32 | [Compound 4-32] 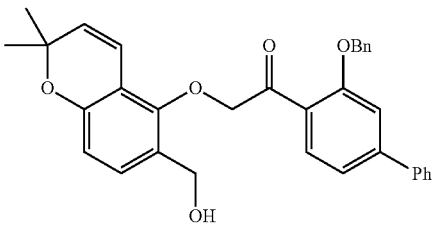 | $^1$H-NMR (CDCl$_3$): 8.119 (d, 1H, J = 8 Hz), 7.536~7.205 (m, 12H), 7.031 (d, 1H, J = 8.4 Hz), 6.560 (d, 1H, J = 8 Hz), 6.423 (d, 1H, J = 9.6 Hz), 5.504 (d, 1H, J = 9.6 Hz), 5.213 (s, 4H), 4.541 (d, 2H, J = 5.6 Hz), 3.240 (t, 1H, J = 6.4 Hz), 1.385 (s, 6H)<br>$^{13}$C-NMR (CDCl$_3$): 195.363, 158.944, 154.081, 153.770, 148.050, 139.675, 135.426, 131.754, 130.445, 129.738, 128.969, 128.799, 128.615, 128.550, 127.963, 127.229, 126.046, 120.287, 117.167, 114.418, 112.231, 111.393, 80.924, 75.570, 71.064, 61.410, 27.570 |
| Example 33 | [Compound 4-33] 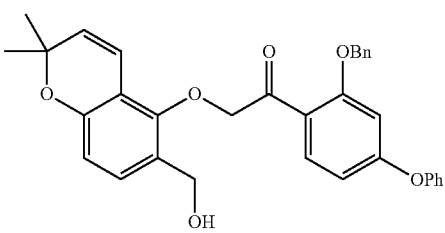 | $^1$H-NMR (CDCl$_3$): 8.037 (d, 1H, J = 8.4 Hz), 7.41~7.009 (m, 11H), 6.603~6.535 (m, 3H), 6.411 (d, 1H, J = 10 Hz), 5.491 (d, 1H, J = 9.6 Hz), 5.157 (s, 2H), 5.035 (s, 2H), 4.532 (d, 2H, J = 6.8 Hz), 3.400 (t, 1H, J = 6.4 Hz), 1.378 (s, 6H)<br>$^{13}$C-NMR (CDCl$_3$): 194.214, 163.765, 160.375, 154.848, 154.168, 153.739, 135.098, 133.150, 130.344, 130.076, 129.724, 128.761, 128.577, 127.904, 126.0660, 124.910, 120.330, 119.189, 119.135, 144.344, 112.135, 110.042, 101.837, 80.752, 75.510, 70.976, 61.407, 27.536 |
| Example 34 | [Compound 4-34] 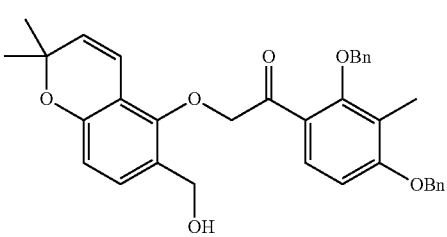 | $^1$H-NMR (CDCl$_3$): 7.722 (d, 1H, J = 8.8 Hz), 7.486~7.320 (m, 10H), 7.013 (d, 1H, J = 8.4 Hz), 6.828 (d, 1H, J = 8.8 Hz), 6.544 (d, 1H, J = 8.4 Hz), 6.418 (d, 1H, J = 10 Hz), 5.481 (d, 1H, J = 10 Hz), 5.162 (s, 2H), 5.142 (s, 2H), 4.850 (s, 2H), 3.406 (t, 1H, J = 6.4 Hz), 2.257 (s, 3H), 1.363 (s, 6H)<br>$^{13}$C-NMR (CDCl$_3$): 196.210, 161.985, 157.971, 154.160, 153.769, 136.275, 135.967, 130.506, 129.731, 129.099, 128.678, 128.646, 128.461, 128.137, 127.892, 127.126, 126.068, 123.289, 120.738, 117.149, 114.469, 112.222, 107.937, 79.434, 75.569, 61.487, 27.538, 9.705 |
| Example 35 | [Compound 4-35] 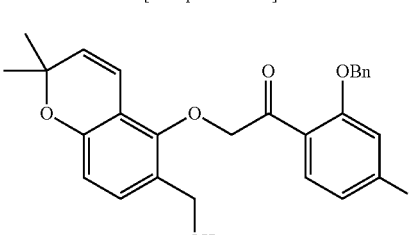 | $^1$H-NMR (CDCl$_3$): 8.101 (dd, 1H, J = 8.8, 6.8 Hz), 7.420~7.347 (m, 5H), 7.036 (d, 1H, J = 8 Hz), 6.827~6.749 (m, 2H), 6.567 (d, 1H, J = 8 Hz), 6.415 (d, 2H, J = 10 Hz), 5.512 (d, 1H, J = 10 Hz), 5.154 (s, 2H), 5.123 (s, 2H), 4.533 (s, 2H), 3.2 (br, 1H), 1.393 (s, 6H)<br>$^{13}$C-NMR (CDCl$_3$): 194, 168.163, 165.619, 160.334, 160.229, 153.975, 153.772, 134.734, 133.584, 133.472, 130.501, 129.760, 128.858, 128.790, 127.915, 125.969, 121.147, 121.119, 117.070, 114.388, 112.291, 108.852, 108.637, 100.820, 100.560, 80.765, 75.579, 71.388, 27.562 |

TABLE 1-continued

| | Chemical structure | NMR |
|---|---|---|
| Example 36 | [Compound 4-36] | $^1$H-NMR (CDCl$_3$): 7.984 (d, 1H, J = 8 Hz), 7.371~7.320 (m, 5H), 7.085~6.988 (m, 3H), 6.549 (d, 1H, J = 8 Hz), 6.380 (d, 1H, J = 10 Hz), 5.491 (d, 1H, J = 9.6 Hz), 5.119 (s, 2H), 5.111 (s, 2H), 4.501 (s, 2H), 3.002 (br, 1H), 1.371 (s, 6H)<br>$^{13}$C-NMR (CDCl$_3$): 194,159, 154.051, 153.893, 140.950, 134.766, 132.341, 130.545, 129.762, 128.855, 128.804, 127.919, 127.397, 125.938, 117.021, 114.402, 113.359, 112,341, 80.803, 75,600, 71.419, 61.322, 27.645 |
| Example 37 | [Compound 4-37] | $^1$H-NMR (CDCl$_3$): 7.707 (d, 1H, J = 8 Hz), 7.649~7.628 (m, 2H), 7.314~7.187 (m, 3H), 7.078 (d, 1H, J = 8 Hz), 7.013 (s, 1H), 6.601 (d, 1H, J = 8.4 Hz), 6.544 (d, 1H, J = 10 Hz), 5.668 (d, 1H, J = 10 Hz), 5.065 (s, 2H), 4.587 (s, 2H), 3 (br, 1H), 2.676~2.619 (m, 2H), 2.433 (s, 3H), 1.429 (s, 6H), 1.179 (t, 3H, J = 6.4 Hz)<br>$^{13}$C-NMR (CDCl$_3$): 194.769, 153.894, 153.594, 151.474, 147.506, 146.216, 131.482, 130.893, 130.512, 130.008, 129.892, 129.787, 128.425, 127.586, 127.036, 125.931, 122.448, 116.989, 114.608, 112.670, 79.074, 75.811, 28.594, 27.597, 21.739, 14.723 |
| Example 38 | [Compound 4-38] | $^1$H-NMR (CDCl$_3$): 7.698 (d, 1H, J = 8 Hz), 7.630 (d, 2H, J = 6.4 Hz), 7.248 (d, 2H, J = 8 Hz), 7.176 (dd, 1H, J = 8, 1.6 Hz), 7.078 (d, 1H, J = 8.4 Hz), 6.997 (d, 1H, J = 1.2 Hz), 6.601 (d, 1H, J = 8.4 Hz), 6.548 (d, 1H, J = 9.6 Hz), 5.670 (d, 1H, J = 10 Hz), 5.067 (s, 2H), 4.589 (d, 2H, J = 6.4 Hz), 2.949 (t, 1H, J = 6.4 Hz), 2.581 (t, 2H, J = 7.6 Hz), 2.431 (s, 3H), 1.605~1.549 (m, 2H), 1.430 (s, 6H), 0.899 (t, 3H, J = 7.2 Hz) |
| Example 39 | [Compound 4-39] | $^1$H-NMR (CDCl$_3$): 7.814 (d, 1H, J = 8.8 Hz), 7.659 (dd, 2H, J = 6.8, 1.6 Hz), 7.239 (d, 2H, J = 8 Hz), 7.069 (d, 1H, J = 8 Hz), 6.858 (dd, 1H, J = 8.8, 1.6 Hz), 6.786 (s, 1H), 6.598 (d, 1H, J = 8 Hz), 6.544 (dd, 1H, J = 9.6, 0.4 Hz), 5.667 (d, 1H, J = 10 Hz), 5.013 (s, 2H), 4.561 (d, 2H, J = 5.6 Hz), 4.032 (q, 2H, J = 14, 7.2 Hz), 3.05 (br, 1H), 2.423 (s, 3H), 1.431 (s, 6H), 1.400 (t, 3H, J = 4.8 Hz)<br>$^{13}$C-NMR (CDCl$_3$): 193.271, 163.431, 153.875, 153.718, 149.422, 146.293, 132.214, 131.584, 130.851, 130.063, 129.825, 128.329, 125.979, 121.846, 117.039, 114.607, 113.663, 112.501, 108.537, 79.121, 75.860, 64.363, 61.228, 27.604, 21.743, 14.429 |
| Example 40 | [Compound 4-40] | $^1$H-NMR (CDCl$_3$): 7.814 (d, 1H, J = 8.8 Hz), 7.662 (dd, 2H, J = 6.8, 1.6 Hz), 7.241 (d, 2H, J = 8 Hz), 7.070 (d, 1H, J = 8.4 Hz), 6.864 (dd, 1H, J = 8.8, 1.6 Hz), 6.769 (d, 1H, J = 2.4 Hz), 6.598 (dd, 1H, J = 8, 0.4 Hz), 6.533 (dd, 1H, J = 10, 0.4 Hz), 5.668 (d, 1H, J = 10 Hz), 5.017 (s, 2H), 4.563 (d, 2H, J = 4.4 Hz), 3.905 (t, 2H, J = 6.8 Hz), 3.079 (br, 1H), 2.423 (s, 3H), 1.829~1.777 (m, 2H), 1.431 (s, 6H), 1.027 (t, 3H, J = 3.6 Hz)<br>$^{13}$C-NMR (CDCl$_3$): 193.262, 163.614, 153.859, 149.399, 146.284, 132.196, 131.800, 131.555, 130.840, 129.943, 129.814, 128.349, 125.969, 121.798, 117.035, 114.596, 113.707, 112.484, 108.528, 79.114, 75.790, 70.229, 27.719, 22.198, 21.734, 10.329 |

TABLE 1-continued

| | Chemical structure | NMR |
|---|---|---|
| Example 41 | [Compound 4-41] | $^1$H-NMR (CDCl$_3$): 7.942 (d, 1H, J = 9.2 Hz), 7.043 (d, 1H, J = 8 Hz), 6.975 (s, 2H), 6.852 (dd, 1H, J = 8.8, 2.4 Hz), 6.575 (d, 1H, J = 7.6 Hz), 6.544 (s, 1H), 6.258 (d, 1H, J = 2.4 Hz), 5.648 (d, 1H, J = 10 Hz), 5.074 (s, 2H), 4.562 (s, 2H), 3.731 (t, 2H, J = 6.4 Hz), 3.1 (br, 1H), 2.517 (s, 6H), 2.321 (s, 3H), 1.750~1.698 (m, 2H), 1.422 (s, 6H), 0.970 (t, 3H, J = 7.6 Hz)<br>$^{13}$C-NMR (CDCl$_3$): 193.390, 163.533, 153.843, 153.775, 149.753, 144.601, 140.337, 132.494, 131.984, 130.764, 130.708, 129.709, 125.983, 122.210, 117.178, 114.649, 113.666, 112.400, 107.455, 79.339, 75.760, 70.058, 61.285, 27.558, 22.682, 22.116, 21.142, 10.241 |
| Example 42 | [Compound 4-42] | $^1$H-NMR (CDCl$_3$): 8.051 (d, 1H, J = 8.8 Hz), 7.042 (d, 1H, J = 8.4 Hz), 6.618~6.548 (m, 3H), 6.415 (d, 1H, J = 2 Hz), 6.045~6.029 (m, 1H), 5.652 (d, 1H, J = 9.6 Hz), 5.392 (dd, 1H, J = 17.2, 1.2 Hz), 5.296 (dd, 1H, J = 11.2, 0.8 Hz), 5.220 (s, 2H), 4.634 (d, 2H, J = 6.8 Hz), 4.584 (d, 2H, J = 5.6 Hz), 4.009~3.953 (m, 3H), 1.849~1.797 (m, 2H), 1.431 (s, 6H), 1.044 (t, 3H, J = 7.6 Hz)<br>$^{13}$C-NMR (CDCl$_3$): 194.362, 165.011, 160.388, 154.687, 153.791, 133.236, 132.016, 130.230, 129.753, 126.206, 119.138, 117.748, 117.546, 114.381, 111.969, 106.68, 99.310, 880.667, 75.423, 69.890, 69.627, 61.722, 27.448, 22.366, 10.406 |
| Example 43 | [Compound 4-43] | $^1$H-NMR (CDCl$_3$): 7.045 (d, 1H, J = 8.4 Hz), 6.996 (s, 2H), 6.728 (d, 1H, J = 2 Hz), 6.578 (s, 1H), 6.555 (d, 1H, J = 2 Hz), 6.521 (dd, 1H, J = 8.8, 2 Hz), 5.989~5.920 (m, 1H), 5.649 (d, 1H, J = 10 Hz), 5.377~5.305 (m, 2H), 5.194 (s, 2H), 4.610 (s, 2H), 4.511 (d, 2H, J = 5.6 Hz), 2.571 (s, 6H), 2.334 (s, 3H), 1.425 (s, 6H)<br>$^{13}$C-NMR (CDCl$_3$): 194.5, 159.172, 154.216, 153.891, 144.344, 140.427, 132.524, 131.977, 131.589, 131.305, 130.549, 129.832, 125.997, 123.1110, 119.710, 117.408, 114.5507, 114.441, 112.325, 110.490, 107.381, 80.673, 75.564, 70.050, 61.556, 27.514, 22.745, 21.106 |
| Example 44 | [Compound 4-44] | $^1$H-NMR (CDCl$_3$): 7.820 (d, 1H, J = 8.8 Hz), 7.660 (d, 1H, J = 8.4 Hz), 7.266~7.233 (m, 2H), 7.071 (d, 1H, J = 8 Hz), 6.888 (dd, 1H, J = 8.8, 2.4 Hz), 6.806 (d, 1H, J = 2.4 Hz), 6.600 (dd, 1H, J = 8.4, 0.4 Hz), 6.532 (dd, 1H, J = 9.6, 0.4 Hz), 6.028~5.959 (m, 1H), 5.669 (d, 1H, J = 10 Hz), 5.422~5.318 (m, 2H), 5.220 (s, 2H), 4.567~4.526 (m, 4H), 3.05 (br, 1H), 2.425 (s, 3H), 1.431 (s, 6H)<br>$^{13}$C-NMR (CDCl$_3$): 193.285, 162.930, 153.859, 153.679, 149.347, 146.328, 132.220, 131.702, 131.497, 130.862, 130.069, 129.827, 128.336, 125.948, 122.144, 118.717, 117.011, 114.595, 113.897, 112.504, 108.808, 79.126, 75.9796, 69.325, 61.209, 27.586, 21.749 |

TABLE 1-continued

| | Chemical structure | NMR |
|---|---|---|
| Example 45 | [Compound 4-45] | $^1$H-NMR (CDCl$_3$): 7.942 (d, 1H, J = 8.8 Hz), 7.044 (d, 1H, J = 8 Hz), 6.978 (s, 2H), 6.876 (dd, 1H, J = 8.8, 2 Hz), 6.586~6.545 (m, 2H), 6.293 (d, 1H, J = 2.4 Hz), 5.938~5.869 (m, 1H), 5.647 (d, 1H, J = 10 Hz), 5.327~5.263 (m, 2H), 5.156 (s, 2H), 4.563 (d, 2H, J = 2.4 Hz), 4.376 (d, 2H, J = 5.6 Hz), 3.092 (br, 1H), 2.529 (s, 6H), 2.334 (s, 3H), 1.421 (s, 6H) $^{13}$C-NMR (CDCl$_3$): 193.422, 162.870, 153.852, 153.741, 149.669, 144.634, 140.332, 132.506, 131.890, 131.706, 130.732, 129.724, 125.976, 122.650, 118.556, 117.161, 114.656, 113.799, 112.430, 107.894, 79.336, 75.767, 69.176, 61.267, 29.330, 22.669, 21.150 |
| Example 46 | [Compound 4-46] | $^1$H-NMR (CDCl$_3$): 7.814 (d, 1H, J = 8.8 Hz), 7.665 (dd, 1H, J = 8.4, 2 Hz), 7.266 (s, 1H), 7.240 (d, 1H, J = 8 Hz), 7.068 (d, 1H, J = 8.4 Hz), 6.858 (dd, 1H, J = 8.8, 2.4 Hz), 6.758 (d, 1H, J = 2 Hz), 6.596 (dd, 1H, J = 8.4, 0.4 Hz), 6.533 (d, 1H, J = 10 Hz), 5.665 (d, 1H, J = 10 Hz), 5.016 (s, 2H), 4.561 (s, 2H), 3.942 (t, 2H, J = 6.8 Hz), 3.095 (br, 1H), 2.421 (s, 3H), 1.792~1.722 (m, 2H), 1.499~1.392 (m, 8H), 0.975 (t, 3H, J = 7.2 Hz) $^{13}$C-NMR (CDCl$_3$): 193.251, 163.619, 153.863, 153.709, 149.408, 146.273, 132.191, 131.595, 130.836, 130.042, 129.810, 128.355, 125.981, 121.812, 117.040, 113.709, 112.487, 108.519, 79.115, 75.788, 68.483, 61.206, 30.829, 27.594, 21.729, 19.098, 13.711 |
| Example 47 | [Compound 4-47] | $^1$H-NMR (CDCl$_3$): 8.047 (d, 1H, J = 8.8 Hz), 7.3884~7.324 (m, 5H), 6.581 (dd, 1H, J = 8.8, 2 Hz), 6.507 (s, 1H), 6.502 (s, 1H), 6.422 (d, 1H, J = 8 Hz), 5.401 (d, 1H, J = 10 Hz), 5.116 (s, 2H), 5.090 (s, 2H), 4.615 (s, 2H), 3.959 (t, 2H, J = 6.8 Hz), 3.2 (br, 1H), 2.325 (s, 3H), 1.836~1.784 (m, 2H), 1.355 (s, 6H), 1.036 (t, 3H, J = 7.6 Hz) $^{13}$C-NMR (CDCl$_3$): 194.185, 164.941, 160.501, 154.568, 153.073, 139.013, 135.410, 133.214, 129.135, 128.709, 128.515, 127.952, 124.437, 117.703, 117.378, 114.027, 111.673, 106.724, 99.451, 81.045, 75.422, 70.892, 69.899, 56.764, 27.548, 22.352, 19.333, 10.396 |
| Example 48 | [Compound 4-48] | $^1$H-NMR (CDCl$_3$): 8.048 (d, 1H, J = 8.8 Hz), 7.388~7.297 (m, 5H), 6.574 (dd, 1H, J = 8.8, 2.4 Hz), 6.490 (d, 1H, J = 2 Hz), 6.363 (d, 1H, J = 9.6 Hz), 6.206 (s, 1H), 5.345 (d, 1H, J = 9.6 Hz), 5.118 (s, 2H), 5.090 (s, 2H), 4.636 (d, 2H, J = 5.2 Hz), 3.948 (t, 2H, J = 6.4 Hz), 3.782 (s, 3H), 3.054 (br, 1H), 1.811~1.758 (m, 2H), 1.365 (s, 6H), 1.030 (t, 3H, J = 7.6 Hz) $^{13}$C-NMR (CDCl$_3$): 193.584, 164.806, 160.403, 158.863, 154.891, 154.301, 135.452, 133.104, 128.805, 128.345, 127.798, 127.061, 117.821, 117.232, 114.778, 107.315, 106.702, 81.117, 75.999, 70.82, 69.844, 55.614, 54.511, 27.550, 22.321, 14.122 |

TABLE 1-continued

| | Chemical structure | NMR |
|---|---|---|
| Example 49 | [Compound 4-49] | $^1$H-NMR (CDCl$_3$): 7.952 (d, 1H, J = 8 Hz), 7.380~7.314 (m, 5H), 6.901 (d, 1H, J = 8 Hz), 6.855 (s, 1H), 6.434 (s, 1H), 6.334 (d, 1H, J = 9.6 Hz), 5.410 (d, 1H, J = 10 Hz), 5.138 (s, 2H), 5.117 (s, 2H), 4.605 (d, 2H, J = 3.2 Hz), 3.050 (br, 1H), 2.656 (q, 2H, J = 15.2, 7.6 Hz), 2.318 (s, 3H), 1.353 (s, 6H), 1.234 (t, 3H, J = 7.6 Hz)<br>$^{13}$C-NMR (CDCl$_3$): 195.367, 158.811, 154.415, 153.049, 152.438, 139.003, 135.578, 131.209, 129.179, 128.630, 128.397, 127.907, 124.342, 122.280, 121.000, 120.907, 117.261, 114.061, 112.049, 111.687, 81.134, 75.415, 70.779, 56.687, 29.130, 27.516, 19.278, 14.979 |
| Example 50 | [Compound 4-50] | $^1$H-NMR (CDCl$_3$): 7.948 (d, 1H, J = 8 Hz), 7.245 (d, 2H, J = 3.2 Hz), 7.113 (d, 2H, 7.6 Hz), 6.877 (d, 1H, J = 8.4 Hz), 6.835 (s, 1H), 6.437 (s, 1H), 6.340 (d, 1H, J = 10 Hz), 5.406 (d, 1H, J = 9.6 Hz), 5.119 (s, 2H), 5.064 (s, 2H), 4.606 (s, 2H), 3.0 (br, 1H), 2.603 (t, 2H, J = 7.6 Hz), 2.347 (s, 3H), 2.324 (s, 3H), 1.673~1.586 (m, 2H), 1.338 (s, 6H), 0.933 (t, 3H, J = 7.2 Hz)<br>$^{13}$C-NMR (CDCl$_3$): 195.369, 158.846, 154.454, 153.083, 150.926, 138.996, 138.227, 132.552, 131.100, 129.287, 129.145, 128.073, 127.683, 124.369, 122.347, 121.558, 117.353, 114.054, 112.648, 81.231, 75.425, 70.715, 56.739, 38.2321, 27.525, 24.023, 21.149, 19.307, 13.696 |
| Example 51 | [Compound 4-51] | $^1$H-NMR (CDCl$_3$): 7.956 (d, 1H, J = 8 Hz), 7.048 (d, 1H, J = 8.4 Hz), 6.907 (dd, 1H, J = 8.8, 0.8 Hz), 6.765 (s, 1H), 6.615~6.554 (m, 2H), 6.073~6.004 (m, 1H), 5.650 (d, 1H, J = 10 Hz), 5.389 (dd, 1H, J = 17.2, 1.2 Hz), 5.291 (dd, 1H, J = 2.4, 1.2 Hz), 5.244 (s, 2H), 4.629~4.615 (m, 4H), 3.8 (br, 1H), 2.662 (t, 2H, J = 7.6 Hz), 1.426 (s, 6H), 1.245 (t, 3H, J = 7.6 Hz)<br>$^{13}$C-NMR (CDCl$_3$): 195.629, 1587.718, 154.543, 153.826, 152.559, 132.231, 131.297, 130.317, 129.774, 126.151, 122.200, 121.036, 118.989, 117.658, 114.410, 112.076, 111.980, 80.768, 75.469, 69.552, 61.660, 29.197, 27.470, 15.023 |
| Example 52 | [Compound 4-52] | $^1$H-NMR (CDCl$_3$): 7.948 (d, 1H, J = 8 Hz), 7.047 (d, 1H, J = 8.4 Hz), 6.884 (dd, 1H, J = 8, 1.2 Hz), 6.745 (s, 1H), 6.601 (d, 1H, J = 10 Hz), 6.562 (d, 1H, J = 8.4 Hz), 6.069~6.000 (m, 1H), 5.650 (d, 1H, J = 9.6 Hz), 5.408~5.217 (m, 2H), 5.244 (s, 2H), 4.641~4.606 (m, 4H), 3.800 (br, 1H), 2.605 (t, 2H, J = 7.6 Hz), 1.677~1.602 (m, 2H), 1.429 (s, 6H), 0.943 (t, 3H, J = 5.6 Hz)<br>$^{13}$C-NMR (CDCl$_3$): 195.608, 158.610, 154.521, 153.801, 151.042, 132.214, 131.152, 130.305, 129.747, 126.158, 122.208, 121.623, 118.961, 117.643, 114.406, 112.557, 112.062, 80.760, 75.455, 69.533, 61.637, 38.252, 27.459, 24.051 13.713 |
| Example 53 | [Compound 4-53] | $^1$H-NMR (CDCl$_3$): 7.947 (d, 1H, J = 8 Hz), 7.048 (d, 1H, J = 8 Hz), 6.888 (d, 1H, J = 8 Hz), 6.744 (s, 1H), 6.613~6.553 (m, 2H), 6.045~6.002 (m, 1H), 6.649 (d, 1H, J = 10 Hz), 5.387 (dd, 1H, J = 17.2, 1.2 Hz), 5.288 (d, 1H, J = 10.4 Hz), 5.242 (s, 2H), 4.634~4.607 (m, 4H), 2.646~2.608 (m, 3H), 1.637~1.561 (m, 2H), 1.430 (s, 6H), 1.399~1.257 (m, 2H), 0.929 (t, 3H, J = 7.2 Hz)<br>$^{13}$C-NMR (CDCl$_3$): 195.613, 158.641, 154.545, 153.837, 151.300, 132.246, 131.194, 130.316, 129.780, 126.166, 122.222, 121.610, 118.970, 117.665, 114.427, 112.520, 112.091, |

| | Chemical structure | NMR |
|---|---|---|
| | | 80.770, 75.476, 69.558, 61.660, 35.965, 33.050, 27.485, 22.293, 13.853 |
| Example 54 | [Compound 4-54] 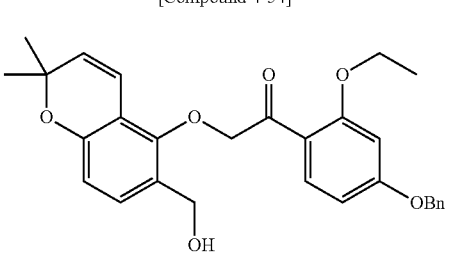 | $^1$H-NMR (CDCl$_3$): 8.050 (dd, 1H, J = 8.8, 1.2 Hz), 7.427~7.338 (m, 5H), 7.042 (dd, 1H, J = 8, 0.8 Hz), 6.650~6.549 (m, 3H), 6.474 (s, 1H), 5.665 (d, 1H, J = 8.4 Hz), 5.219 (s, 2H), 5.108 (s, 2H), 4.653~4.607 (m, 3H), 4.241 (br, 1H), 1.427 (s, 6H), 1.357 (s, 3H), 1.342 (s, 3H)<br>$^{13}$C-NMR (CDCl$_3$): 194.745, 164.444, 159.670, 154.967, 153.851, 135.907, 133.374, 130.156, 129.853, 128.717, 128.330, 127.485, 126.201, 118.450, 117.989, 114.223, 111.883, 106.602, 100.247, 80.878, 75.310, 70.847, 70.327, 61.766, 27.321, 21.994 |
| Example 55 | [Compound 4-55] 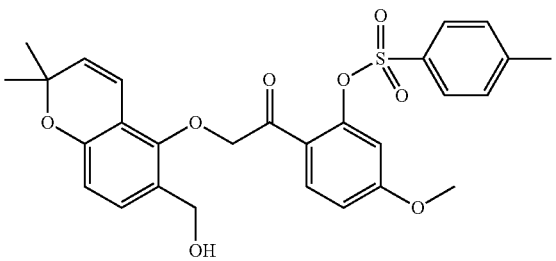 | $^1$H-NMR (CDCl$_3$): 7.824 (d, 1H, J = 8.8 Hz), 7.663 (d, 1H, J = 8.4 Hz), 7.272 (s, 1H), 7.243 (d, 1H, J = 8 Hz), 7.069 (d, 1H, J = 8 Hz), 6.868 (dd, 1H, J = 8.8, 2.4 Hz), 6.751 (d, 1H, J = 2.4 Hz), 6.593 (d, 1H, J = 8.4 Hz), 6.536 (d, 1H, J = 9.6 Hz), 5.664 (d, 1H, J = 10 Hz), 5.026 (s, 2H), 4.562 (s, 2H), 3.798 (s, 3H), 3.15 (br, 1H), 2.418 (s, 3H), 1.427 (s, 6H)<br>$^{13}$C-NMR (CDCl$_3$): 194, 163.926, 153.806, 153.609, 149.353, 146.301, 132.214, 131.516, 130.816, 130.029, 129.774, 128.309, 125.937, 122.075, 116.978, 114.564, 113.116, 112.464, 108.177, 79.077, 75.759, 61.093, 55.809, 27.550, 21.698 |
| Example 56 | [Compound 4-56] 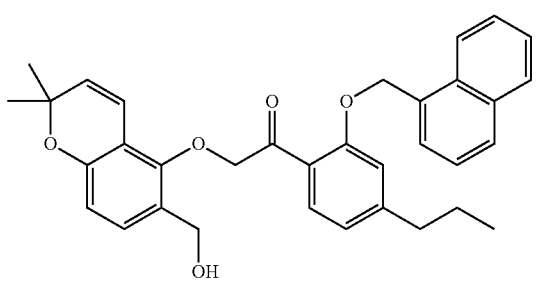 | $^1$H-NMR (CDCl$_3$): 8.009 (d, 1H, J = 8 Hz), 7.946 (d, 1H, J = 8 Hz), 7.874 (d, 1H, J = 7.6 Hz), 7.508~7.424 (m, 4H), 7.016 (s, 1H), 6.951 (dd, 1H, J = 8.4, 0.8 Hz), 6.870 (d, 1H, J = 8 Hz), 6.438 (d, 1H, J = 8.4 Hz), 5.903 (d, 1H, J = 9.6 Hz), 5.528 (s, 2H), 5.155 (d, 1H, J = 10 Hz), 4.883 (s, 2H), 4.258 (d, 2H, J = 4.8 Hz), 3.049 (br, 1H), 2.672 (t, 2H, J = 7.6 Hz), 1.733~1.676 (m, 2H), 1.279 (s, 6H), 0.983 (t, 3H, J = 7.2 Hz) |
| Example 57 | [Compound 4-57] 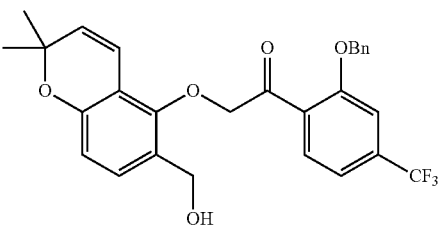 | $^1$H-NMR (CDCl$_3$): 7.691 (d, 1H, J = 7.6 Hz), 7.416~7.358 (m, 5H), 7.267 (d, 1H, J = 9.2 Hz), 7.156 (s, 1H), 6..983 (d, 1H, J = 8.4 Hz), 6.526 (d, 1H, J = 8 Hz), 6.383 (d, 1H, J = 9.6 Hz), 5.524 (d, 1H, J = 6.4 Hz), 5.485 (d, 1H, J = 10 Hz), 5.116 (q, 2H, J = 16, 11.2 Hz), 4.619 (d, 1H, J = 11.6 Hz), 4.464 (d, 1H, J = 11.6 Hz), 4.233 (dd, 1H, J = 10., 2.4 Hz), 3.859 (q, 1H, J = 10, 8.4 Hz), 1.374 (s, 3H), 1.356 (s, 3H) |
| Example 58 | [Compound 4-58] 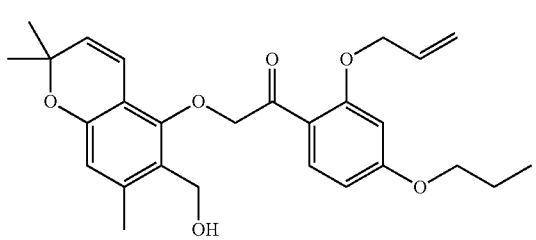 | $^1$H-NMR (CDCl$_3$): 8.028 (d, 1H, J = 8.8 Hz), 6.584~6.557 (m, 2H), 6.538~6.408 (m, 2H), 6.071~6.002 (m, 1H), 5.580 (d, 1H, J = 10 Hz), 5.388 (dd, 1H, J = 17.2, 1.2 Hz), 5.295 (dd, 1H, J = 10.8, 1.2 Hz), 5.207 (s, 2H), 4.723 (d, 2H, J = 3.6 Hz), 4.583 (d, 2H, J = 5.6 Hz), 3.963 (t, 2H, J = 6.8 Hz), 3.669 (br, 1H), 2.348 (s, 3H), 1.844~1.792 (m, 2H), 1.412 (s, 6H), 1.040 (t, 3H, J = 7.6 Hz)<br>$^{13}$C-NMR (CDCl$_3$): 194.441, 164.916, 160.332, 154.940, 153.077, 138.949, 133.145, 132.049, 129.089, 124.555, 119.021, 117.799, 117.648, 113.959, 111.768, 106.661, 99.312, |

TABLE 1-continued

| | Chemical structure | NMR |
|---|---|---|
| | | 80.855, 75.354, 69.856, 69.681, 56.850, 27.465, 22.346, 19.329, 10.378 |
| Example 59 | [Compound 4-59] | ¹H-NMR (CDCl₃): 8.033 (d, 1H, J = 8 Hz), 6.581~6.537 (m, 2H), 6.458 (s, 1H), 6.405 (d, 1H, J = 2 Hz), 6.068~5.999 (m, 1H), 5.583 (d, 1H, J = 10 Hz), 5.389 (dd, 1H, J = 18.8, 1.2 Hz), 5.296 (dd, 1H, J = 10.4, 1.2 Hz), 5.208 (s, 2H), 4.724 (s, 2H), 4.579 (d, 2H, J = 5.6 Hz), 4.079 (q, 2H, J = 14, 7.2 Hz), 3.683 (br, 1H), 2.350 (s, 3H), 1.447~1.413 (m, 9H) ¹³C-NMR (CDCl₃): 194.467, 164.720, 160.332, 154.965, 153.107, 138.981, 133.213, 132.068, 129.121, 124.580, 119.055, 117.816, 117.761, 113.998, 111.799, 106.589, 99.403, 80.876, 75.388, 69.597, 63.949, 56.901, 27.497, 19.426, 14.592 |
| Example 60 | [Compound 4-60] | ¹H-NMR (CDCl₃): 7.997 (dd, 1H, J = 7.6, 1.6 Hz), 7.529 (t, 1H, J = 8 Hz), 7.088~7.004 (m, 2H), 9.970 (d, 1H, J = 8.4 Hz), 6.614 (d, 1H, J = 10 Hz), 6.582 (d, 1H, J = 8.4 Hz), 6.659 (d, 1H, J = 10 Hz), 5.206 (s, 2H), 4.606 (s, 2H), 3.880 (s, 3H), 3.306 (br, 1H), 1.249 (s, 6H) |
| Example 61 | [Compound 4-61] | ¹H-NMR (CDCl₃): 7.576 (s, 1H), 7.504~7.324 (m, 5H), 7.297 (d, 1H, J = 6.8 Hz), 7.065 (d, 1H, J = 8 Hz), 6.876 (d, 1H, J = 8.4 Hz), 6.596 (s, 1H), 6.574 (s, 1H), 5.658 (d, 1H, J = 10 Hz), 5.210 (s, 2H), 5.174 (s, 2H), 4.607 (d, 2H, J = 6 Hz), 4.161 (q, 2H, J = 14, 6.8 Hz), 3.165 (t, 1H J = 6 Hz), 1.486 (t, 3H, J = 6.8 Hz), 1.425 (s, 6H) ¹³C-NMR (CDCl₃): 193.041, 154.272, 153.906, 153.863, 148.440, 136.577, 130.902, 129.974, 128.511, 127.951, 127.345, 127.013, 125.968, 122.799, 116.971, 114.608, 113.354, 112.637, 111.670, 76.409, 75.779, 71.131, 64.582, 61.237, 27.637, 14.590 |
| Example 62 | [Compound 4-62] | ¹H-NMR (CDCl₃): 8.038 (d, 1H, J = 8 Hz), 6.588 (dd, 1H, J = 8.8, 2.4 Hz), 6.551 (dd, 1H, J = 9.6, 0.4 Hz), 6.443 (d, 1H, J = 2 Hz), 6.231 (s, 1H), 6.068~5.988 (m, 2H), 5.489 (d, 1H, J = 10 Hz), 5.442~5.269 (m, 4H), 5.193 (s, 2H), 4.734 (s, 2H), 4.593~4.572 (m, 4H), 3.805 (s, 3H), 3.3 (br, 1H), 1.421 (s, 6H) ¹³C-NMR (CDCl₃): 193.834, 164.157, 160.240, 158.901, 155.163, 154.371, 133.163, 132.272, 132.061, 127.111, 118.970, 118.374, 118.132, 117.611, 114.862, 107.431, 106.790, 99.730, 95.984, 80.951, 76.020, 69.617, 69.048, 55.676, 54.620, 27.525 |
| Example 63 | [Compound 4-63] | ¹H-NMR (CDCl₃): 7.964 (d, 1H, J = 7.6 Hz), 7.249 (d, 1H, J = 9.6 Hz), 7.118 (d, 2H, J = 8 Hz), 7.010 (d, 1H, J = 8 Hz), 6.895 (d, 1H, J = 8 Hz0, 6.842 (s, 1H), 6.541 (d, 1H, J = Hz), 6.391 (d, 1H, J = 10 Hz), 5.468 (d, 1H, J = 9.6 Hz), 5.125 (s, 2H), 5.070 (s, 2H), 4.505 (d, 2H, J = 6.4 Hz), 3.243 (t, 1H, J = 6.4 Hz), 2.614 (t, 2H, J = 7.6 Hz), 2.351 (s, 3H), 1.681~1.603 (m, 2H), 1.371 (s, 6H), 0.941 (t, 3H, J = 7.6 Hz) |

TABLE 1-continued

| | Chemical structure | NMR |
|---|---|---|
| Example 64 | [Compound 4-64]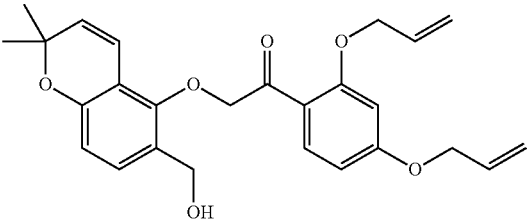 | ¹H-NMR (CDCl₃): 8.048 (d, 1H, J = 8 Hz), 7.042 (d, 1H, J = 8.4 Hz), 6.614~6.548 (m, 3H), 6.449 (d, 1H, J = 2 Hz), 6.067~5.995 (m, 2H), 5.651 (d, 1H, J = 10 Hz), 5.444~5.285 (m, 4H), 5.216 (s, 2H), 4.631 (d, 2H, J = 6.4 Hz), 4.596-4.571 (m, 4H), 3.964 (t, 1H, J = 6.8 Hz), 1.430 (s, 6H)<br>¹³C-NMR (CDCl₃): 194.330, 164.317, 160.321, 154.619, 153.784, 133.201, 132.202, 131.945, 130.248, 129.739, 126.183, 119.170, 118.384, 117.872, 117.699, 114.379, 111.991, 106.869, 99.644, 80.651, 75.428, 69.640, 69.049, 61.670, 27.446 |
| Example 65 | [Compound 4-65]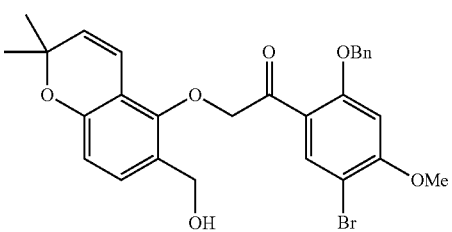 | ¹H-NMR (CDCl₃): 8.226 (s, 1H), 7.356~7.340 (m, 5H), 7.004 (d, 1H, J = 8 Hz), 6.535 (d, 1H, J = 8.4 Hz), 6.466 (s, 1H), 6.391 (d, 1H, J = 10 Hz), 5.589 (d, 1H, J = 10 Hz), 5.140 (s, 2H), 5.090 (s, 2H), 4.503 (s, 2H), 3.880 (s, 3H), 3.304 (br, 1H), 1.369 (s, 6H)<br>¹³C-NMR (CDCl₃): 192.960, 160.781, 159.785, 154.001, 153.726, 135.344, 134.899, 130.429, 129.713, 128.860, 128.773, 127.840, 126.024, 118.387, 117.098, 114.380, 112.214, 103.874, 96.809, 80.664, 75.542, 71.436, 61.290, 56.447, 27.550 |
| Example 66 | [Compound 4-66]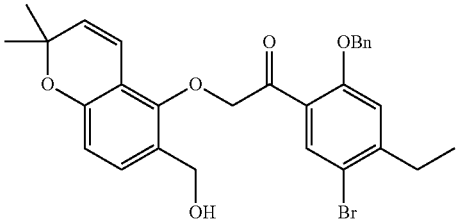 | ¹H-NMR (CDCl₃): 8.153 (s, 1H), 7.899~7.305 (m, 5H), 7.101 (d, 1H, J = 8.4 Hz), 6.902 (s, 1H), 6.537 (d, 1H, J = 8.4 Hz), 6.385 (d, 1H, J = 9.6 Hz), 5.487 (d, 1H, J = 10 Hz), 5.111 (s, 4H), 4.479 (s, 2H), 3.15 (br, 1H), 2.741 (q, 2H), 1.366 (s, 6H), 1.213 (t, 3H)<br>¹³C-NMR (CDCl₃): 194.067, 157.790, 153.830, 153.714, 150.582, 135.130, 134.619, 130.479, 129.690, 128.744, 128.611, 127.874, 125.907, 123.793, 116.989, 115.933, 114.364, 113.804, 112.275, 80.706, 75.554, 71.223, 61.183, 29.899, 27.539, 13.716 |
| Example 67 | [Compound 4-107]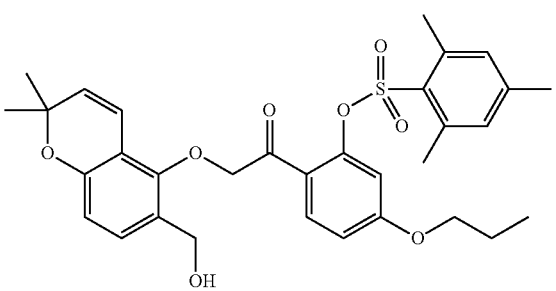 | ¹H-NMR (CDCl₃): 7.979 (d, 1H, J = 8.8 Hz), 7.022~6.970 (m, 2H), 6.852 (d, 1H, J = 6.8 Hz), 6.569 (d, 1H, J = 8.4 Hz), 6.179 (s, 1H), 5.183 (s, 2H), 4.547 (s, 2H), 3.704 (t, 2H, J = 6.8 Hz), 3.1 (br, 1H), 2.783 (t, 2H, J = 6.4 Hz), 2.521 (s, 6H), 2.325 (s, 3H), 1.772~1.681 (m, 4H), 1.325 (s, 6H), 0.960 (t, 3H, J = 6.4 Hz)<br>¹³C-NMR (CDCl₃): 193.349, 163.498, 156.236, 154.929, 149.805, 144.620, 140.311, 132.573, 131.963, 130.804, 127.966, 124.781, 122.253, 114.952, 113.711, 113.148, 107.229, 77.984, 73.991, 70.016, 32.154, 26.639, 22.598, 22.074, 17.789, 10.197 |
| Example 68 | [Compound 4-121]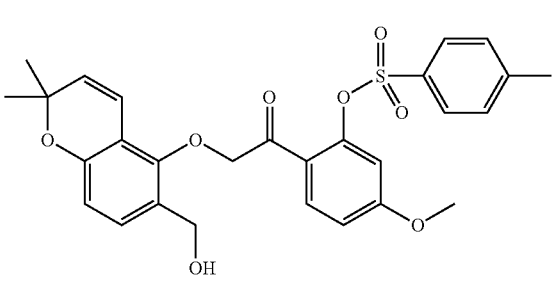 | ¹H-NMR (CDCl₃): 7.875 (d, 1H, J = 8.8 Hz), 7.640 (d, 2H, J = 8.4 Hz), 7.223 (d, 2H, J = 8 Hz), 7.042 (d, 1H, J = 8.4 Hz), 6.890 (d, 1H, J = 2.8 Hz), 6.703 (s, 1H), 6.627 (d, 1H, J = 8.4 Hz), 5.046 (s, 2H), 4.546 (s, 2H), 3.794 (s, 3H), 3.1 (br, 1H), 2.749 (t, 2H, J = 6.8 Hz), 2.415 (s, 3H), 1.741 (t, 2H, J = 6.4 Hz), 1.332 (s, 6H)<br>¹³C-NMR (CDCl₃): 193.321, 163.945, 156.181, 154.994, 149.466, 147.364, 146.315, 132.356, 131.660, 130.052, 128.307, 128.143, 124.754, 122.182, 114.848, 113.260, 113.172, 108.098, 77.774, 74.030, 61.494, 55.824, 32.133, 26.675, 21.734, 17.811 |

Using the method disclosed in the above Examples, it is possible to commercially produce 2-((6-(hydroxymethyl)chromen-5-yl)oxy)-1-phenylethanone derivatives under mild conditions in a simple, easy and economical manner.

So far, the present invention has been described with reference to the preferred embodiments. Those skilled in the art will appreciate that the present invention can be embodied in modified forms without departing from the essential features of the present invention. Therefore, the disclosed embodiments should be considered in descriptive sense only and not for purposes of limitation. Therefore, the scope of the present invention is defined not by the detailed description of the present invention but by the appended claims, and all modifications within a range equivalent to the scope of the appended claims should be construed as being included in the present invention.

The invention claimed is:

1. A method for synthesizing a 2-((6-(hydroxymethyl)chromen-5-yl)oxy)-1-phenylethanone derivative represented by Formula 4, the method comprising steps of:
   (a) reducing a compound of Formula 1 to produce a compound of Formula 2; and
   (b) coupling the compound of Formula 2 with a compound of Formula 3:

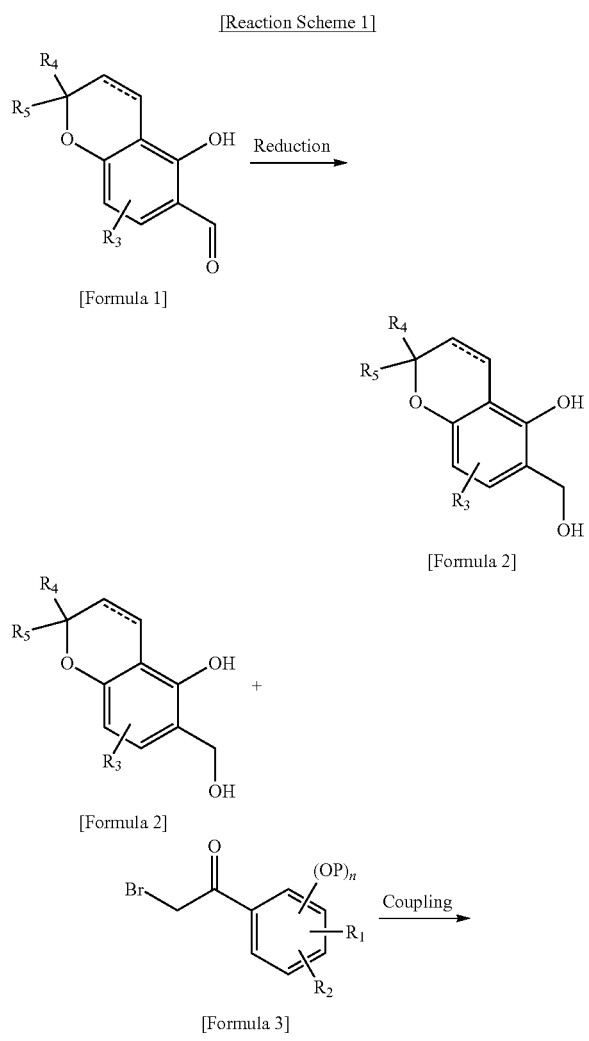

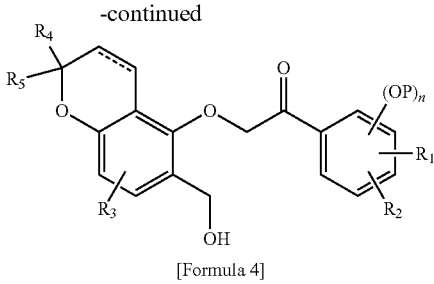

wherein the doted line is a optional double bond;

$R_1$ and $R_2$ are each independently any one of a hydrogen atom; a substituted or unsubstituted linear or branched $C_1$-$C_6$ alkyl group; a halogen atom; a substituted or unsubstituted linear or branched $C_1$-$C_6$ alkoxy group; a substituted or unsubstituted linear or branched $C_1$-$C_4$ thioalkyl group; a substituted or unsubstituted allyloxy group; a substituted or unsubstituted aryloxy group; and a phenyl group;

$R_3$ is any one of a hydrogen atom; a $C_1$-$C_3$ alkyl group; a $C_1$-$C_3$ alkoxy group; and a halogen atom;

$R_4$ and $R_5$ are each independently any one of a hydrogen atom and a $C_1$-$C_2$ alkyl group;

P is any one of a substituted or unsubstituted linear or branched $C_1$-$C_4$ alkyl group; a substituted or unsubstituted benzyl group; an allyl group; a t-butyldimethylsilyl group; t-butyldiphenylsilyl group; a dimethylphenylsilyl group; a trimethylsilyl group; $MeSO_2$, a p-toluenesulfonyl group; and a 2,4,6-trimethylbenzenesulfonyl group;

n is from 1 to 3;

when n is 2 or 3, said OP is independently the same or different; and the substituent for the substituted alkyl group, substituted alkoxy group, substituted thioalkyl group, substituted allyloxy group, substituted aryloxy group or substituted benzyl group is any one of a benzyloxy group, a halogen atom, a linear or branched $C_1$-$C_5$ alkyl group, a linear or branched $C_1$-$C_5$ alkoxy group, a linear or branched $C_1$-$C_3$ thioalkyl group, a nitro group, and a naphthalene group.

2. The method of claim 1, wherein step (b) is performed under a basic condition.

3. The method of claim 2, wherein the basic condition is formed by adding at least one basic compound selected from among sodium hydroxide (NaOH), potassium hydroxide (KOH), sodium carbonate ($Na_2CO_3$), lithium carbonate ($Li_2CO_3$), potassium carbonate ($K_2CO_3$), sodium hydrogen carbonate ($NaHCO_3$), potassium hydrogen carbonate ($KHCO_3$), triethylamine, and pyridine.

4. A method for synthesizing a 3-phenyl-2,3,4,8,9,10-hexahydropyrano[2,3-f]chromene derivative of Formula I, the method comprising steps of:
   (i) producing a compound of Formula 4 using the method of claim 3, and cyclizing the compound of Formula 4 to produce a compound of Formula 5; and
   (ii) reducing the compound of Formula 5:

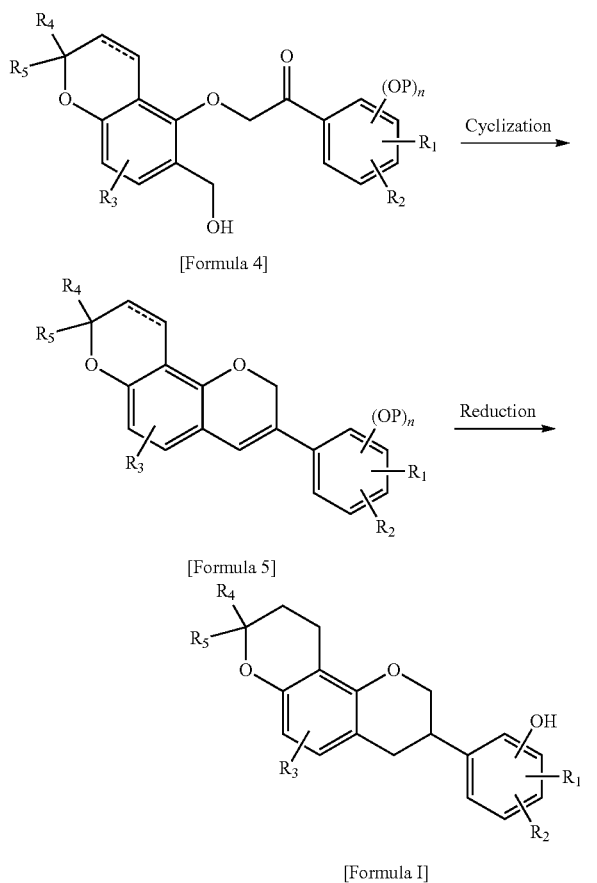

[Reaction Scheme 2]

[Formula 4]

[Formula 5]

[Formula I]

wherein
the dotted line is an optional double bond;
$R_1$ and $R_2$ are each independently any one of a hydrogen atom; a substituted or unsubstituted linear or branched $C_1$-$C_6$ alkyl group; a halogen atom; a substituted or unsubstituted linear or branched $C_1$-$C_6$ alkoxy group; a substituted or unsubstituted linear or branched $C_1$-$C_4$ thioalkyl group; a substituted or unsubstituted allyloxy group; a substituted or unsubstituted aryloxy group; and a phenyl group;
$R_3$ is any one of a hydrogen atom; a $C_1$-$C_3$ alkyl group; a $C_1$-$C_3$ alkoxy group; and a halogen atom;
$R_4$ and $R_5$ are each independently any one of a hydrogen atom; and a $C_1$-$C_2$ alkyl group;
P is any one of a substituted or unsubstituted linear or branched $C_1$-$C_4$ alkyl group; a substituted or unsubstituted benzyl group; an allyl group; a t-butyldimethylsilyl group; t-butyldiphenylsilyl group; a dimethylphenylsilyl group; a trimethylsilyl group; $MeSO_2$; a p-toluenesulfonyl group; and a 2,4,6-trimethylbenzenesulfonyl group;
n is from 1 to 3;
when n is 2 or 3, said OP is independently the same or different; and
the substituent for the substituted alkyl group, substituted alkoxy group, substituted thioalkyl group, substituted allyloxy group, substituted aryloxy group or substituted benzyl group is any one of a benzyloxy group, a halogen atom, a linear or branched $C_1$-$C_5$ alkyl group, a linear or branched $C_1$-$C_5$ alkoxy group, a linear or branched $C_1$-$C_3$ thioalkyl group, a nitro group, and a naphthalene group.

5. A method for synthesizing a 3-phenyl-2,3,4,8,9,10-hexahydropyrano[2,3-f]chromene derivative of Formula I, the method comprising steps of:
(i) producing a compound of Formula 4 using the method of claim 2, and cyclizing the compound of Formula 4 to produce a compound of Formula 5; and
(ii) reducing the compound of Formula 5:

[Reaction Scheme 2]

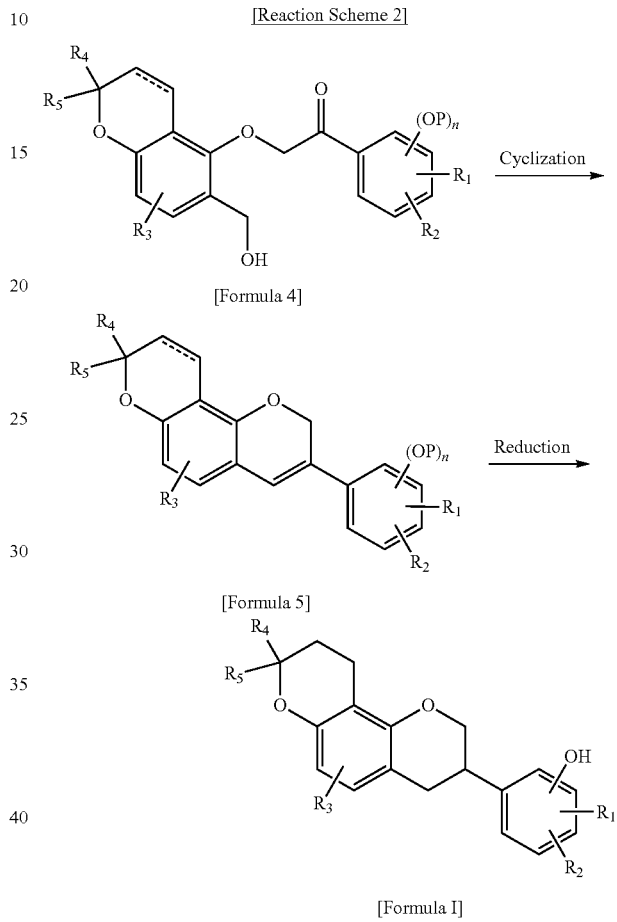

[Formula 4]

[Formula 5]

[Formula I]

wherein
the dotted line is an optional double bond;
$R_1$ and $R_2$ are each independently any one of a hydrogen atom; a substituted or unsubstituted linear or branched $C_1$-$C_6$ alkyl group; a halogen atom; a substituted or unsubstituted linear or branched $C_1$-$C_6$ alkoxy group; a substituted or unsubstituted linear or branched $C_1$-$C_4$ thioalkyl group; a substituted or unsubstituted allyloxy group; a substituted or unsubstituted aryloxy group; and a phenyl group;
$R_3$ is any one of a hydrogen atom; a $C_1$-$C_3$ alkyl group; a $C_1$-$C_3$ alkoxy group; and a halogen atom;
$R_4$ and $R_5$ are each independently any one of a hydrogen atom; and a $C_1$-$C_2$ alkyl group;
P is any one of a substituted or unsubstituted linear or branched $C_1$-$C_4$ alkyl group; a substituted or unsubstituted benzyl group; an allyl group; a t-butyldimethylsilyl group; t-butyldiphenylsilyl group; a dimethylphenylsilyl group; a trimethylsilyl group; $MeSO_2$; a p-toluenesulfonyl group; and a 2,4,6-trimethylbenzenesulfonyl group;
n is from 1 to 3;
when n is 2 or 3, said OP is independently the same or different; and the substituent for the substituted alkyl group, substituted alkoxy group, substituted thioalkyl group, substituted allyloxy group, substituted aryloxy group or substituted benzyl group is any one of a benzyloxy group, a halogen atom, a linear or branched $C_1$-$C_5$ alkyl group, a linear or branched $C_1$-$C_5$ alkoxy group, a linear or branched $C_1$-$C_3$ thioalkyl group, a nitro group, and a naphthalene group.

6. A method for synthesizing a 3-phenyl-2,3,4,8,9,10-hexahydropyrano[2,3-f]chromene derivative of Formula I, the method comprising steps of:

(i) producing a compound of Formula 4 using the method of claim 1, and cyclizing the compound of Formula 4 to produce a compound of Formula 5; and (ii) reducing the compound of Formula 5:

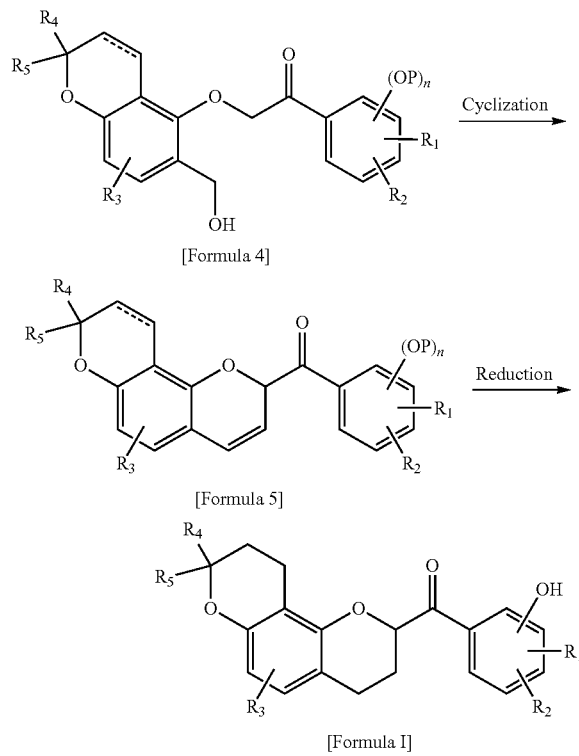

wherein
the dotted line is an optional double bond;
$R_1$ and $R_2$ are each independently any one of a hydrogen atom; a substituted or unsubstituted linear or branched $C_1$-$C_6$ alkyl group; a halogen atom; a substituted or unsubstituted linear or branched $C_1$-$C_6$ alkoxy group; a substituted or unsubstituted linear or branched $C_1$-$C_4$ thioalkyl group; a substituted or unsubstituted allyloxy group; a substituted or unsubstituted aryloxy group; and a phenyl group;
$R_3$ is any one of a hydrogen atom; a $C_1$-$C_3$ alkyl group; a $C_1$-$C_3$ alkoxy group; and a halogen atom;
$R_4$ and $R_5$ are each independently any one of a hydrogen atom; and a $C_1$-$C_2$ alkyl group;
P is any one of a substituted or unsubstituted linear or branched $C_1$-$C_4$ alkyl group; a substituted or unsubstituted benzyl group; an allyl group; a t-butyldimethylsilyl group; t-butyldiphenylsilyl group; a dimethylphenylsilyl group; a trimethylsilyl group; $MeSO_2$; a p-toluenesulfonyl group; and a 2,4,6-trimethylbenzenesulfonyl group;
n is from 1 to 3;
when n is 2 or 3, said OP is independently the same or different; and
the substituent for the substituted alkyl group, substituted alkoxy group, substituted thioalkyl group, substituted allyloxy group, substituted aryloxy group or substituted benzyl group is any one of a benzyloxy group, a halogen atom, a linear or branched $C_1$-$C_5$ alkyl group, a linear or branched $C_1$-$C_5$ alkoxy group, a linear or branched $C_1$-$C_3$ thioalkyl group, a nitro group, and a naphthalene group.

7. A 6-(hydroxymethyl)chromen-5-ol derivative represented by the following Formula 2 or a solvate thereof:

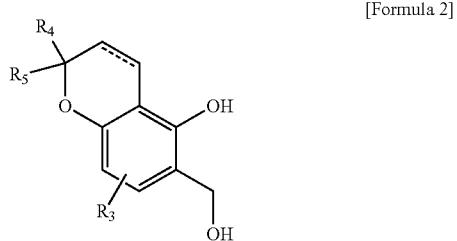

wherein
the dotted line is an optional double bond;
$R_3$ is any one of a hydrogen atom; a $C_1$-$C_3$ alkyl group; a $C_1$-$C_3$ alkoxy group; and a halogen atom; and
$R_4$ and $R_5$ are each independently any one of a hydrogen atom; and a $C_1$-$C_2$ alkyl group.

* * * * *